(12) United States Patent
Crawford

(10) Patent No.: US 12,126,946 B2
(45) Date of Patent: Oct. 22, 2024

(54) SYSTEM AND METHOD FOR PROVIDING A DATA NETWORK

(71) Applicant: IFP Connect, LLC, Boise, ID (US)

(72) Inventor: Eric S. Crawford, Eagle, ID (US)

(73) Assignee: IFP Connect, LLC, Boise, ID (US)

( * ) Notice: Subject to any disclaimer, the term of this patent is extended or adjusted under 35 U.S.C. 154(b) by 241 days.

(21) Appl. No.: 17/646,758

(22) Filed: Jan. 3, 2022

(65) Prior Publication Data
US 2022/0295161 A1 Sep. 15, 2022

Related U.S. Application Data

(60) Provisional application No. 63/144,656, filed on Feb. 2, 2021.

(51) Int. Cl.
*H04Q 11/00* (2006.01)
*H04L 12/28* (2006.01)
*H04L 49/351* (2022.01)

(52) U.S. Cl.
CPC ..... *H04Q 11/0005* (2013.01); *H04L 12/2885* (2013.01); *H04L 49/351* (2013.01); *H04Q 11/0003* (2013.01); *H04Q 11/0071* (2013.01); *H04Q 2011/0041* (2013.01)

(58) Field of Classification Search
CPC ........... H04Q 11/0003; H04Q 11/0005; H04Q 11/0071; H04Q 2011/0041; H04L 12/2885; H04L 49/351
USPC .............................................. 398/43, 46, 58
See application file for complete search history.

(56) References Cited

U.S. PATENT DOCUMENTS

| | | | | |
|---|---|---|---|---|
| 6,364,535 B1* | 4/2002 | Coffey | ................. | H01R 31/065 |
| | | | | 439/357 |
| 7,027,431 B1* | 4/2006 | Thompson | ............. | H04N 7/104 |
| | | | | 348/E7.051 |
| 2003/0112965 A1* | 6/2003 | McNamara | ......... | H04M 1/0293 |
| | | | | 379/399.01 |
| 2004/0013369 A1* | 1/2004 | Coffey | ................. | G02B 6/4292 |
| | | | | 385/53 |
| 2008/0030971 A1* | 2/2008 | Miller | ..................... | G06F 1/266 |
| | | | | 713/153 |
| 2017/0117971 A1* | 4/2017 | Sipes, Jr. | ............. | G02B 6/3817 |
| 2017/0146746 A1* | 5/2017 | Pals | ....................... | H01R 24/76 |

* cited by examiner

Primary Examiner — Li Liu
(74) Attorney, Agent, or Firm — Hawley Troxell Ennis & Hawley LLP; Philip McKay

(57) ABSTRACT

A multi-port Ethernet fiber switch converts the TDD to OD and then provides the OD to multi-port Ethernet fiber switch ports for transmission on optical lines connected to the multi-port Ethernet fiber switch ports. The OD on the multiple optical lines is then transmitted to multiple integrated converter/receiver in-wall mounted data access stations through the multiple optical lines. Each integrated converter/receiver in-wall mounted data access station includes an integrated OD to TDD converter/receiver that is positioned in a cavity in the wall in which the integrated converter/receiver in-wall mounted data access station resides. Each integrated converter/receiver in-wall mounted data access station includes one or more data ports, such as standard RJ-45 ports.

16 Claims, 31 Drawing Sheets

SYSTEM AND METHOD FOR PROVIDING A DATA NETWORK

BACKGROUND

A significant feature of virtually all modern commercial and residential construction is the provision for communications and data transfer capabilities to, and within, the structures, e.g., the provision of cable, Ethernet, and other data network and communications hook up capabilities. While historically providing these capabilities was often a secondary consideration, and often a system installed post construction, this is no longer the case. In fact, providing integrally and well thought out/designed data distribution and management systems is now at the forefront of any new construction.

Historically, communication systems, such as Internet, intranet, virtual private networks, phone systems, and various other forms of data distribution and management were largely built on point-to-point systems using Ethernet cable and ports such as the standard RJ-45 ports and "CAT" series of Ethernet cables, e.g., CAT 5, CAT 5E, CAT 6 cable etc. In a typical configuration where multiple data ports were needed to support multiple Internet devices, such as computers, printers, switches, and the like, an individual Ethernet cable had to be run from the data source, e.g., a router, to each port used by each Internet device. Consequently, for eight Internet devices, eight Ethernet ports were needed with each Ethernet port requiring its own Ethernet cable.

FIG. 1A shows a simplified diagram of a typical prior art Ethernet cable-based data network 100. As seen in FIG. 1A, an Internet Service Provider (ISP) 101, such as a cable company, transmits and receives Traditional Digital Data (TDD) 103. TDD is defined herein as digital data transmitted as electronic signals comprised of ones and zeros, or high and low, electrical impulses of high and low voltages. Typically, the TDD 103 is "chopped up" into data packets of defined sizes rather than being transmitted in a continuous stream.

One significant limitation to using TDD is that data transmitted as electrical impulses is susceptible to significant attenuation over relatively short distances. In fact, when traditional Ethernet cabling, such as CAT 5E or CAT 6, is used as the transmission medium, TDD is typically only reliable when the TDD is transmitted over distances of one hundred meters or less, unless expensive amplifying/boosting devices/stations are employed every one hundred meters or so. Furthermore, as discussed below, when using TDD electrical pulses of ones and zeros to transmit data, this signal is highly susceptible to interference caused by nearby electrical cabling and devices. This interference decreases transmission speeds and reliability.

To address the attenuation issue, some ISPs use optical systems, such as optical fiber systems and fiber optic lines, to transmit Optical Data (OD) over long distances between the source, e.g., the ISP, and the destination, e.g., the customer building/location. Using optical systems, OD is encoded in pulses of light as opposed to electrical impulses. Ones and zeros are still used to create digital data, however, using OD, a high or low is determined by the presence or absence of a light pulse, respectively, rather that the high or low voltages used in TDD. This has two favorable results. First, since carefully channeled light is not susceptible to attenuation due to transmission wires, OD can be transmitted over hundreds, even thousands, of miles without attenuation. Second, as discussed in more detail below, OD, being composed of light impulses, is not susceptible to interference from electrical sources such as high voltage power lines, or any magnetic forces typically generated by human activity.

However, a significant drawback to using OD and optical systems is that the TDD must be converted to OD before transmission using optical systems and then the OD must be re-converted to TDD for use by Internet devices such as computers, switches, printers, etc. Consequently, as shown in FIG. 1A, at the ISP 101, a TDD to OD converter/transmitter 105 receives the TDD 103 and converts it to OD 107. The OD 107 is then transmitted over an optical line, i.e., OD line 108, to customer location 110.

As seen in FIG. 1A, at customer location 110, OD 107 is typically received by OD to TDD converter/receiver 113 which then converts the OD 107 back into TDD 103 for transmission on TDD lines TDD1 through TDD 8. Typically, OD to TDD converter/receiver 113 resides in centralized Internet distribution location for the customer, sometimes referred to as an Internet or IT closet 111. IT closet 111 typically also serves as a hub where the often-numerous TDD lines, such as TDD1 through TDD8 in FIG. 1A, are coupled to a router 115 for data and Internet service distribution to Internet devices 151 through 158. As noted above, and as seen in FIG. 1A, each Internet device 151 through 158 is connected to TDD in a point-to-point connection with each Internet device 151, 152, 153, 154, 155, 156, 157, and 158, requiring its own Ethernet cable TDD1, TDD2, TDD3, TDD4, TDD5, TDD6, TDD7, and TDD8, respectively. Consequently, for even just eight Internet devices, eight separate Ethernet cables are required.

Eight Internet connections might be enough for a simple household, although in many cases this would be a bare minimum. However, for even a small business there is likely to be one hundred or more Internet devices in use, and therefore one hundred or more individual Ethernet cables would be required using prior art methods. For large operations/structures thousands of Internet devices may be needed requiring thousands of individual Ethernet cables.

The situation above is problematic for several reasons. First, each Ethernet cable is about 5.2 mm in diameter. So, for one hundred cables, the diameter for the system containing the one hundred cables would be about 5.2 centimeters, or over two inches. That is a significant dimension, in and of itself, and is very difficult to accommodate given that each cable needs to run in the walls of the building, and often trough or around structural components such as lumber, metal beams, pipes, weight bearing components, etc.

In addition, to further complicate the situation, since traditionally TDD is used to transmit data within the building, and TDD data is transmitted as electrical impulses, TDD data and Ethernet cables carrying the TDD data are highly susceptible to interference from any standard 120- or 220-volt power lines nearby. This is because at the relatively large voltage used with high voltage power lines in both commercial and residential construction there is significant current being moved that creates significant magnetic fields in all radial directions perpendicular to the direction of current flow. These magnetic fields/forces disrupt and compromise the transmission of the data packets of TDD electrical pulses through the low voltage (typically 48 volt) TDD lines, such as Ethernet lines.

To address this issue, it is typically mandated that any TDD/Ethernet line be installed such that no point of the low voltage TDD Ethernet line comes within twelve inches of any point of a power or other high voltage line. Consequently, if the diameter of the one hundred-TDD cable system is, as noted, over two inches, and if we assume a diameter of a high voltage power line is about a half of an inch, then the gap between a high voltage power line and a one hundred-TDD cable system run needs to be 13 or 14 inches, center to center. The problem arises from the fact that both high voltage power and Ethernet lines need to be run throughout the structure. However, finding 14 inch spacing in walls, through structural components, around piping etc., is extremely complicated at best, and not possible in many cases.

In addition, as noted above, even within a structure, TDD/Ethernet cable can only be used to transmit data one hundred meters or less. Therefore, any TDD/Ethernet line run that exceeds one hundred meters is not allowed. Consequently, any run that exceeds one hundred meters, either because the straight distance is one hundred meters or more, or because obstacles and avoiding high voltage power lines require run routes that wind around distances that effectively exceed one hundred meters, is not workable.

To address this issue, a theoretical solution might be to use optical systems within the structure to transmit OD from point to point within the building using optical lines, such as fiber optic lines. However, currently, this option is considered unworkable and economically unviable in most cases. This is because, as noted, optical systems are traditionally point to point systems that require a separate TDD to OD converter/transmitter, a separate optical line, and a separate OD to TDD converter/receiver for each Internet device. Consequently, as seen in FIG. 1B, for the minimal eight Internet device system discussed above with respect to FIG. 1A, eight TDD to OD converter/transmitters 121 through 128, eight optical lines OD1 through OD8, and eight OD to TDD converter/receivers 131 through 138 would be required to support the eight Internet devices 151 through 158. This is in addition to OD to TDD converter/receiver 113 and router 115.

FIG. 1C shows a picture of one example of an OD to TDD Converter/Transmitter system 190, such as any of the eight OD to TDD converter/receivers 131 through 138, that would typically be used with the hypothetical data/Internet distribution system of FIG. 1B if prior art optical systems were used to transmit OD within a structure from point to point for eight Internet devices.

As seen in FIG. 1C, OD to TDD Converter/Transmitter system 190 includes TDD Converter/Transmitter unit 191, power transformer 193 and power cord 194, and cable 197 with connector 195. In various versions, OD to TDD Converter/Transmitter system 190 can be as large as 5 inches, by 5 inches, by 2 inches and cost of $200.00, each. The reader will note reference grid 196 for indicating the relative size of just one OD to TDD Converter/Transmitter system 190, such as any of the eight OD to TDD converter/receivers 131 through 138. This same reference grid 196 will also be shown below for comparative size analysis.

FIG. 1D shows a picture of the one example of an OD to TDD Converter/Transmitter system 190 of FIG. 1C, such as any of the eight OD to TDD converter/receivers 131 through 138, plugged into input jack 198 and plugged into power jack 199 that would typically be used as only one or eight OD to TDD converter/receivers 131 through 138 with the hypothetical data/Internet distribution system of FIG. 1B if prior art optical systems were used to transmit OD within a structure from point to point for eight Internet devices.

As seen in FIGS. 1C and 1D, the system of FIG. 1B not only represents a significant expense and inefficient use of resources, but the resultant system requires physical space for each of the TDD to OD converter/transmitters 121-128 and each of the OD to TDD converter/receivers 131-138 required for each Internet device. So, for a small business needing to connect one hundred Internet devices, two hundred hardware components, one hundred TDD to OD converter/transmitters and one hundred OD to TDD converter/receivers, and one hundred OD lines would need to be purchased, maintained, plugged in, and provided with desk or wall space. In addition, even if space were found, each of the one hundred TDD to OD converter/transmitters and one hundred OD to TDD converter/receivers placed on desktops or mounted to walls would be susceptible to damage from being hit, knocked down, or otherwise abused in the course of normal office activity. In addition, each of these one hundred TDD to OD converter/transmitters and one hundred OD to TDD converter/receivers requires its own external 120-volt AC-to-12-volt DC power supply. This creates additional cost, hardware, and space requirements as well as requiring/consuming additional power and power outlets. Consequently, despite the numerous potential advantages of optical data systems, the use of point-to-point optical data systems is rarely considered a practical solution.

What is needed is a technical solution to the technical problem of providing effective and efficient distribution of OD throughout a structure and efficient and effective conversion of the OD to TDD at the point of need/use.

SUMMARY

Embodiments of the present disclosure provide a solution to the long-standing technical problem of providing effective and efficient distribution of OD throughout a structure and efficient conversion of TDD to OD for transmission and then efficient conversion of the OD back to TDD at the point of need, i.e., at the Internet device locations throughout the structure.

According to embodiments disclosed herein, TDD is provided to a router which in turn provides the TDD to a disclosed multi-port Ethernet fiber switch. In accordance with one embodiment, the disclosed multi-port Ethernet fiber switch converts the TDD to OD and then provides the OD to multi-port Ethernet fiber switch ports for transmission on optical lines, such as fiber optic lines, connected to the multi-port Ethernet fiber switch ports. Consequently, the disclosed multi-port Ethernet fiber switch converts the TDD to OD in a single conversion and then provides the OD to multiple optical lines, all within the single multi-port Ethernet fiber switch. Therefore, using the disclosed embodiments, only one device is required for TDD to OD conversion and transmission on multiple OD lines.

The OD on the multiple optical lines is then transmitted to multiple integrated converter/receiver in-wall mounted data access stations through the multiple optical lines. In one embodiment, each integrated converter/receiver in-wall mounted data access station includes an integrated OD to TDD converter/receiver that, in one embodiment, can be positioned in a cavity in a wall in which the integrated converter/receiver in-wall mounted data access station resides. In addition, in one embodiment, each integrated converter/receiver in-wall mounted data access station includes one or more data ports, such as standard RJ-45 ports. In this way, multiple data ports, such as standard RJ-45 ports, carrying TDD are provided from an OD to TDD converter/receiver device that is similar to a standard electrical outlet in size and structure, and which conceals the OD to TDD converter/receiver inside a wall.

In some embodiments, the integrated converter/receiver in-wall mounted data access stations include two or more standard RJ-45 ports. In some embodiments the integrated converter/receiver in-wall mounted data access stations include four or more standard RJ-45 ports. In other embodiments, any number of standard RJ-45 ports, including only one, can be included in the integrated converter/receiver in-wall mounted data access stations.

Consequently, using the disclosed embodiments, a single multi-port Ethernet fiber switch can convert TDD to OD and provide the OD on multiple multi-port Ethernet fiber switch ports for transmission to multiple integrated converter/receiver in-wall mounted data access stations. In addition, each integrated converter/receiver in-wall mounted data access station can convert the OD to TDD and provide TDD on multiple data ports, such as standard RJ-45 ports, at the point of need, anywhere in the structure, using OD to TDD converter/receivers that are integrated into the integrated converter/receiver in-wall mounted data access stations and can be neatly concealed in a wall.

Therefore, the use of the disclosed methods and systems significantly reduces the number of TDD to OD conversion/transmission devices required and integrates the OD to TDD conversion/receiver devices into multiple standard RJ-45 port integrated converter/receiver in-wall mounted data access stations so that the OD to TDD conversion/receiver devices can be positioned within a wall, like a standard electrical outlet box, out of the way of desktops and working space.

As an example, for the very minimal case where eight end user Internet devices need Internet/data access, TDD coming into the business from an ISP could be fed to a router that, in turn, feeds the TDD to the disclosed multi-port Ethernet fiber switch that, in this specific example, may include at least two multi-port Ethernet fiber switch ports connected to at least two optical lines. The disclosed multi-port Ethernet fiber switch would then convert the TDD to OD for transmission on the two optical lines. In this example, the two optical lines would then provide the OD to two of the disclosed integrated converter/receiver in-wall mounted data access stations that include four standard RJ-45 ports each and one each of the disclosed integrated OD to TDD conversion/receivers. In this specific example, eight standard RJ-45 ports would then be provided with TDD at two separate wall locations and for use by eight separate Internet devices.

Consequently, in this specific example, using the disclosed embodiments, the equipment required to provide Internet to eight Internet devices would include one router, one disclosed multi-port Ethernet fiber switch, two optical lines, and two integrated converter/receiver in-wall mounted data access stations. In addition, since optical lines are used, the data can be provided as far away from the disclosed multi-port Ethernet fiber switch as desired and the disclosed integrated converter/receiver in-wall mounted data access stations, including the OD to TDD converters/receivers, can be hidden in the wall and out of the way.

In addition, since, using the disclosed methods and systems, optical lines are used inside the structure, the data can be provided as far away from the disclosed multi-port Ethernet fiber switch as desired and the disclosed integrated converter/receiver in-wall mounted data access stations, including the OD to TDD converters/receivers, can be hidden in the wall and out of the way. In contrast, as noted, using traditional Ethernet TDD systems, connecting eight Internet devices would require a router and eight separate TDD Ethernet lines and the eight separate TDD Ethernet lines could only be used for distances of one hundred meters or less. Likewise, if traditional optical systems were used to connect the same eight Internet devices, this would require a router, eight TDD to OD converters/transmitters, eight optical lines, and eight OD to TDD converters/receivers. In addition, a 120 volt outlet and desk or wall space for each of the eight TDD to OD converters/transmitters and each of the eight OD to TDD converters/receivers would be required.

As another example, for the case where one hundred end user Internet devices need Internet access, TDD coming into the business from an ISP could be fed to a router that, in turn, feeds the TDD to one or more of the disclosed multi-port Ethernet fiber switch that, in this specific example, may include twenty-five or more multi-port Ethernet fiber switch ports connected to twenty-five optical lines. The disclosed multi-port Ethernet fiber switch would then convert the TDD to OD for transmission on the twenty-five optical lines. In this example, the twenty-five optical lines would then provide the OD to twenty-five of the disclosed integrated converter/receiver in-wall mounted data access stations that each include four standard RJ-45 ports each and one each of the disclosed integrated OD to TDD conversion/receivers. In this specific example, one hundred standard RJ-45 ports would then be provided with TDD at up to twenty-five separate wall locations for use by up to one hundred separate Internet devices.

Consequently, in this specific example, the equipment required to provide Internet to one hundred Internet devices would include one router, one disclosed multi-port Ethernet fiber switch, twenty-five optical lines, twenty-five low voltage in wall power lines, and twenty-five integrated converter/receiver in-wall mounted data access stations. This is in contrast to the router and one hundred individual TDD/Ethernet lines required by prior art Ethernet systems and to the router, one hundred individual TDD to OD converters/transmitters, one hundred optical lines, and one hundred OD to TDD converters/receivers that might be required using prior art optical systems.

Again, since using the disclosed methods and systems optical lines are used inside the structure, the data can be provided as far away from the disclosed multi-port Ethernet fiber switch as desired and the disclosed integrated converter/receiver in-wall mounted data access stations, including the OD to TDD converters/receivers, can be hidden in the wall and out of the way.

In addition, since the disclosed method and system uses optical lines and OD, the optical lines and OD are not subject to electrical/magnetic interference. Consequently, using the disclosed methods and systems, the optical lines can run as close to high voltage power lines as desired and there is no need for the standard 14-inch separation required in prior art. Indeed, using the disclosed methods and systems, the optical lines can be bundled with the high voltage power lines and actually use the same conduits, holes, spaces, and runs as the high voltage power lines. This makes the use of the disclosed methods and systems much simpler, more efficient, and more effective than the use of traditional Ethernet lines.

In addition, the diameter of an optical line, such as a standard fiber optic line is 0.25 to 0.5 mm. Thus, the diameter of an optical line is less than $\frac{1}{20}$ to $\frac{1}{10}$ the 5.2 mm diameter of a typical Ethernet line. Consequently, by using optical lines and OD, the disclosed methods and systems allow for a highly significant reduction in the size of any holes or conduits used when compared with traditional Ethernet systems.

As shown above, and as discussed in more detail below, the disclosed methods and systems provide a solution to the long-standing technical problem of providing effective and efficient distribution of OD throughout a structure and effective and efficient conversion of TDD to OD and then OD to TDD at the point of need, i.e., at the Internet device locations throughout the structure.

BRIEF DESCRIPTION OF THE DRAWINGS

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Figure 1A:
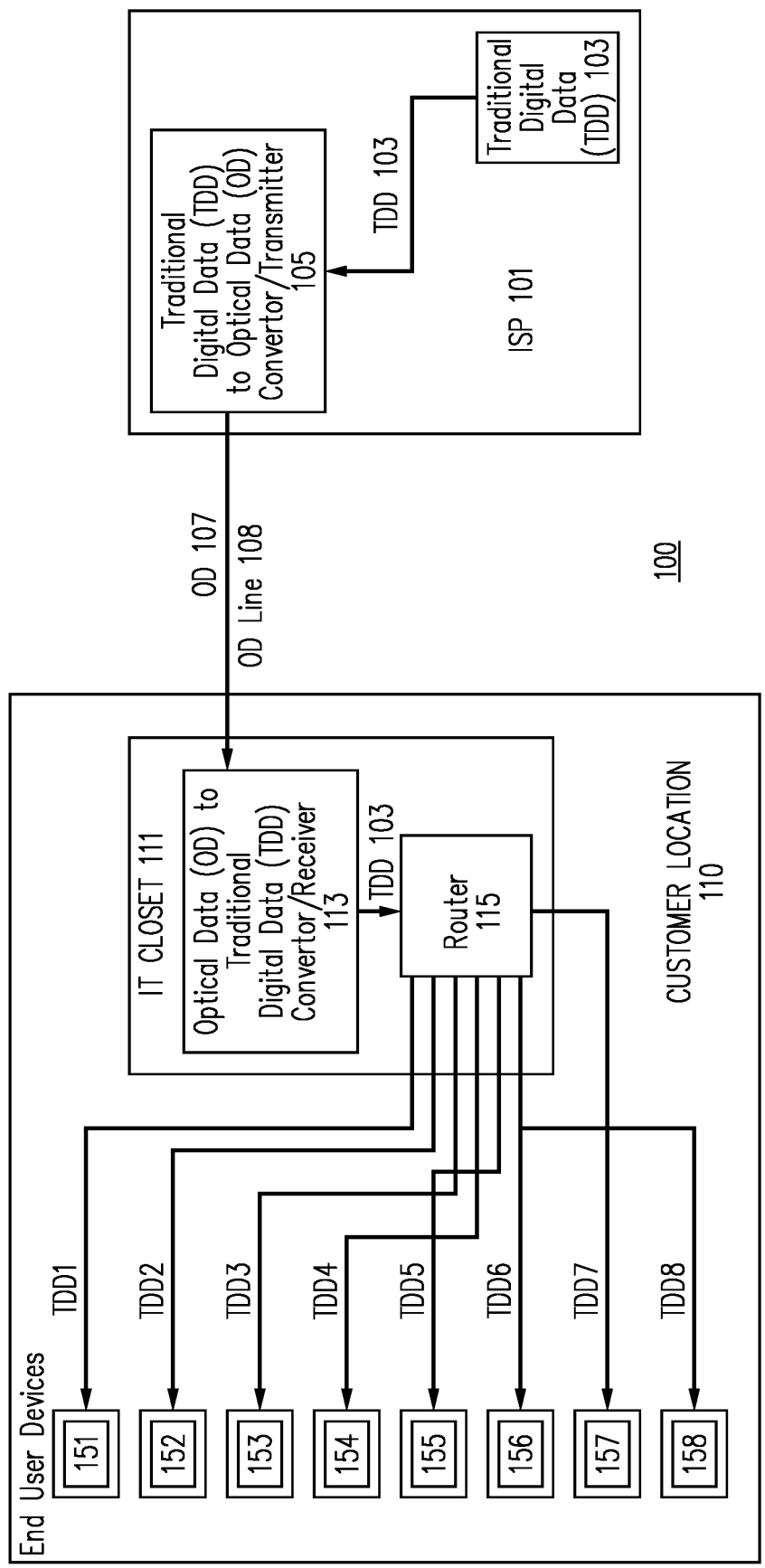
FIG. 1A shows a traditional prior art Ethernet cable data network used to provide to Internet access/data to eight Internet devices.
Figure 1B:
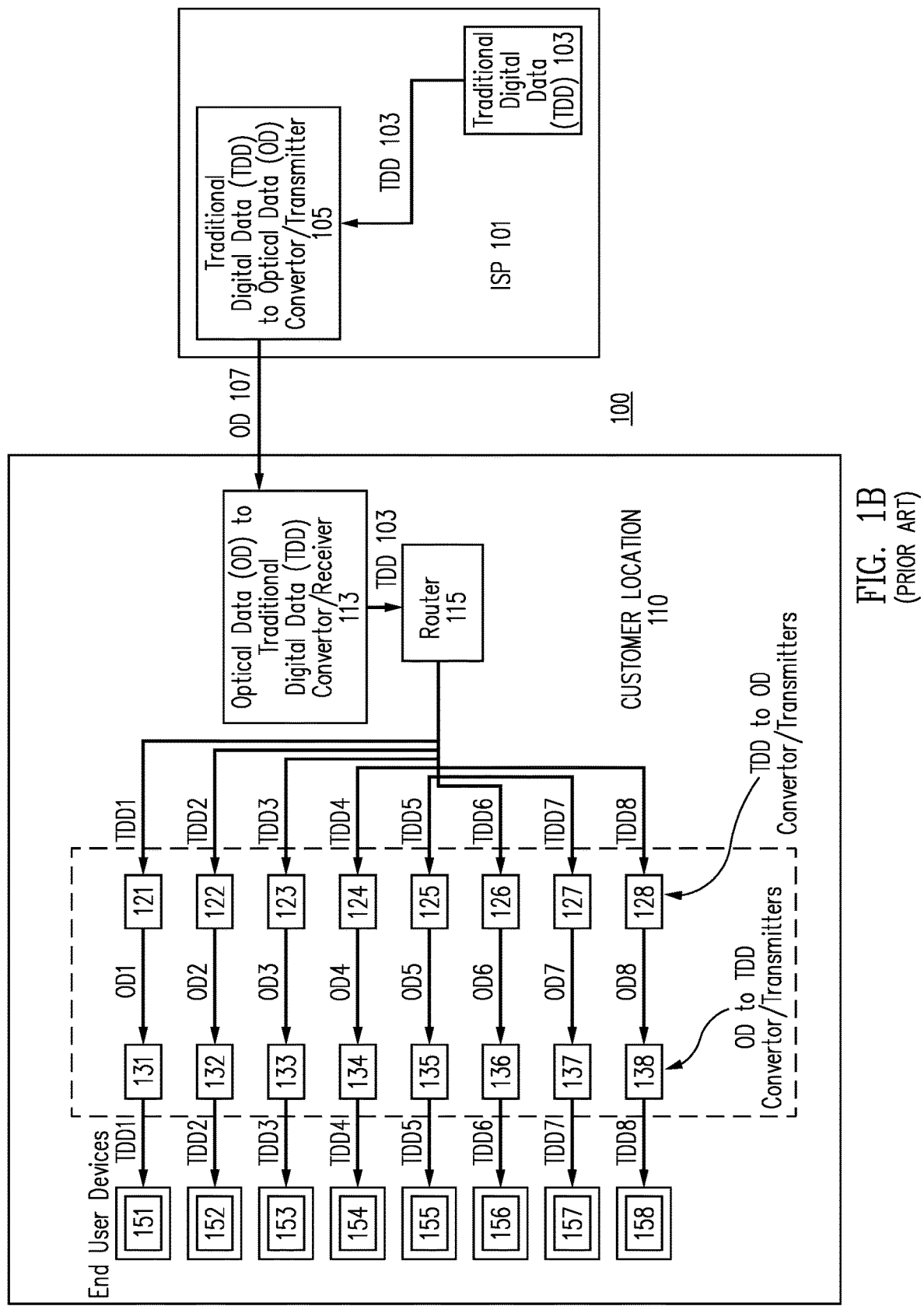
FIG. 1B is a hypothetical data/Internet distribution system that would result if prior art optical systems were used to transmit OD within a structure from point to point for eight Internet devices.

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

According to embodiments disclosed herein, a multi-port Ethernet fiber switch converts the TDD to OD and then provides the OD to multi-port Ethernet fiber switch ports for transmission on optical lines connected to the multi-port Ethernet fiber switch ports. The OD on the multiple optical lines is then transmitted to multiple integrated converter/receiver in-wall mounted data access stations through the multiple optical lines. Each integrated converter/receiver in-wall mounted data access station includes an integrated OD to TDD converter/receiver that is positioned in a cavity in the wall in which the integrated converter/receiver in-wall mounted data access station resides. Each integrated converter/receiver in-wall mounted data access station includes one or more data ports, such as standard RJ-45 ports.

According to embodiments disclosed herein, TDD is provided to a router which in turn provides the TDD to a disclosed multi-port Ethernet fiber switch. In accordance with one embodiment, the disclosed multi-port Ethernet fiber switch converts the TDD to OD and then provides the OD to each of the multi-port Ethernet fiber switch ports for transmission on optical lines, such as fiber optic lines, connected to the multi-port Ethernet fiber switch ports. Consequently, the disclosed multi-port Ethernet fiber switch converts the TDD to OD in a single conversion using a single device and then provides the OD to multiple optical lines, all within the single multi-port Ethernet fiber switch. Consequently, using the disclosed methods and systems, only one device is required for TDD to OD conversion and transmission on multiple OD lines. The OD on the multiple optical lines is then transmitted to integrated converter/receiver in-wall mounted data access stations through the multiple optical lines.

In one embodiment, each integrated converter/receiver in-wall mounted data access station includes an integrated OD to TDD converter/receiver that, in one embodiment, can positioned in a cavity in the wall in which the integrated converter/receiver in-wall mounted data access station resides. In addition, in one embodiment, each integrated converter/receiver in-wall mounted data access station includes one or more data ports, such as standard RJ-45 ports. In this way, multiple data ports, such as standard RJ-45 ports, carrying TDD are provided from an OD to TDD converter/receiver device that is similar to a standard electrical outlet in size and structure, and which conceals the OD to TDD converter/receiver inside a wall.

In some embodiments, the integrated converter/receiver in-wall mounted data access stations include two or more standard RJ-45 ports. In some embodiments the integrated converter/receiver in-wall mounted data access stations include four or more standard RJ-45 ports. In other embodiments, any number of standard RJ-45 ports can be included in the integrated converter/receiver in-wall mounted data access stations.

Consequently, using the disclosed embodiments, a single multi-port Ethernet fiber switch can convert TDD to OD and provide the OD on multiple multi-port Ethernet fiber switch ports for transmission to multiple integrated converter/receiver in-wall mounted data access stations. In addition, each integrated converter/receiver in-wall mounted data access station can convert the OD to TDD and provide TDD on multiple data ports, such as standard RJ-45 ports, at the point of need, anywhere in the structure, using OD to TDD converter/receivers that are neatly concealed in a wall.

Therefore, the use of the disclosed methods and systems significantly reduces the number of TDD to OD conversion/transmission devices required and integrates the OD to TDD conversion/receiver devices into multiple standard RJ-45 port integrated converter/receiver in-wall mounted data access stations so that the OD to TDD conversion/receiver devices can be positioned within a wall, like a standard electrical outlet box, out of the way of desktops and working space.

Figure 2:
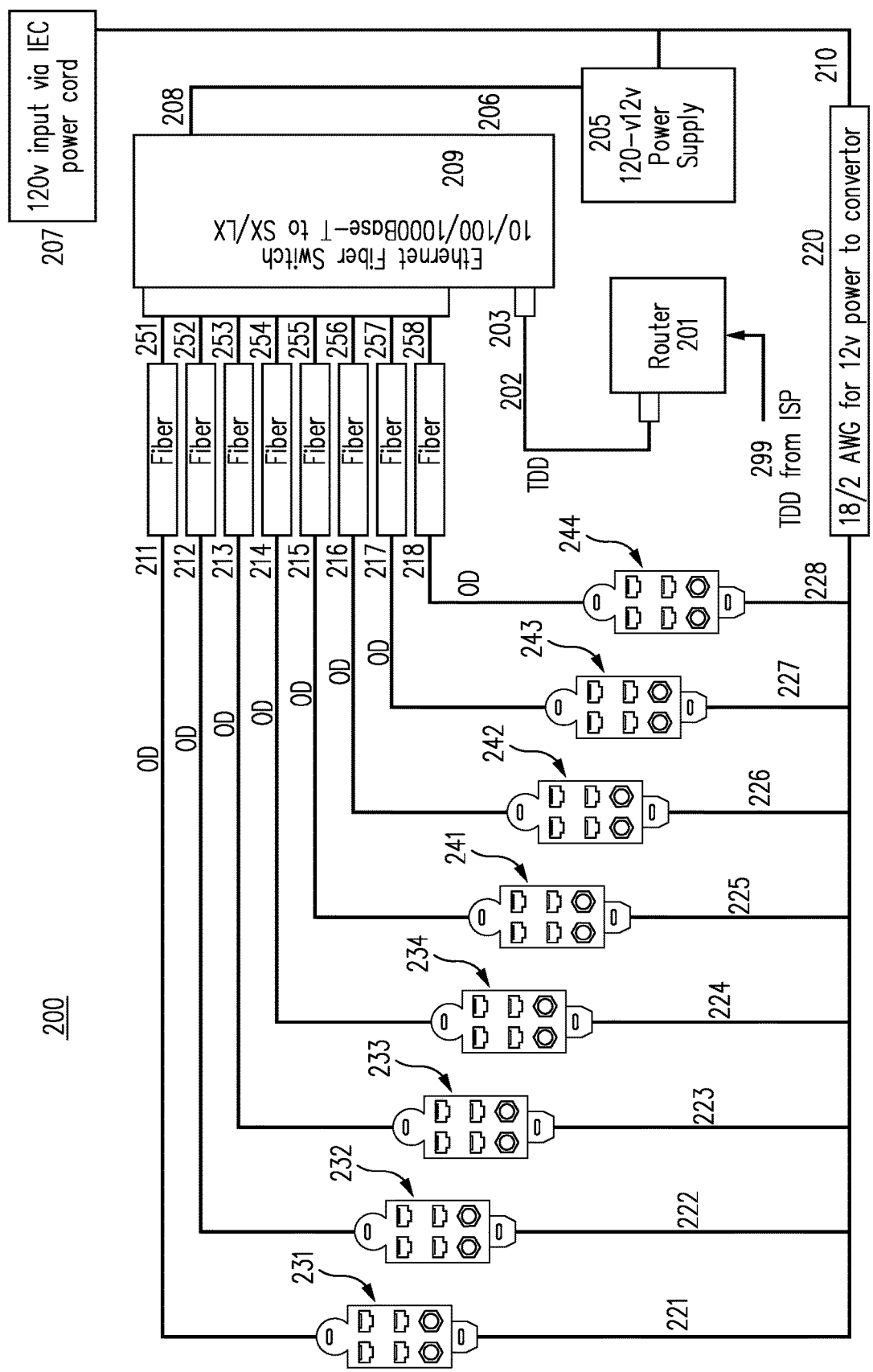
FIG. 2 shows one embodiment of the disclosed data network including a multi-port Ethernet fiber switch and integrated converter/receiver in-wall mounted data access stations in accordance with one embodiment.

FIG. 2 shows a schematic diagram of one embodiment of the disclosed data network 200 including a multi-port Ethernet fiber switch and integrated converter/receiver in-wall mounted data access stations in accordance with one embodiment.

Referring to FIG. 2, in one embodiment, standard 120V high voltage power is provided from power source 207 to multi-port Ethernet fiber switch power supply 205 and converter/receiver in-wall mounted data access stations power converter 220 via power line 210. Multi-port Ethernet fiber switch power supply 205 then converts the 120V power to 12V power and provides the 12V power to multi-port Ethernet fiber switch 209 at connector 208 via multi-port Ethernet fiber switch power line 206.

Figure 6C:
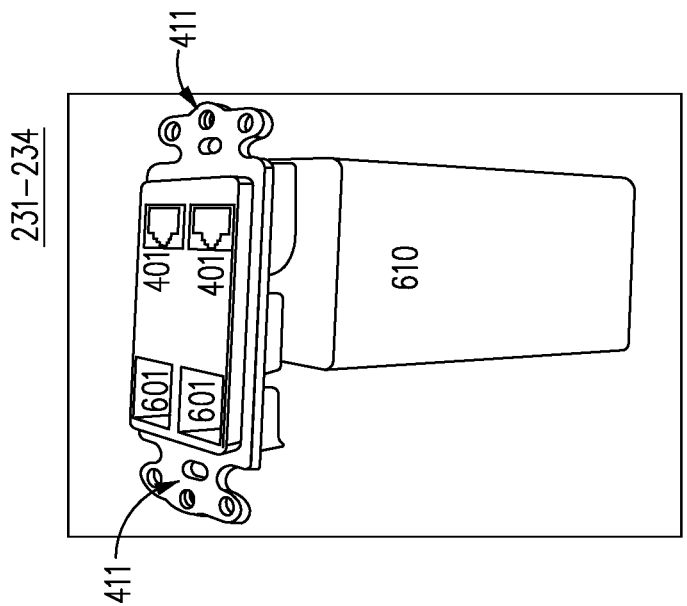
FIG. 6C shows one embodiment of a two standard RJ-45 port integrated converter/receiver in-wall mounted data access station of FIGS. 4 and 4B in more detail, in accordance with one embodiment.
Figure 6B:
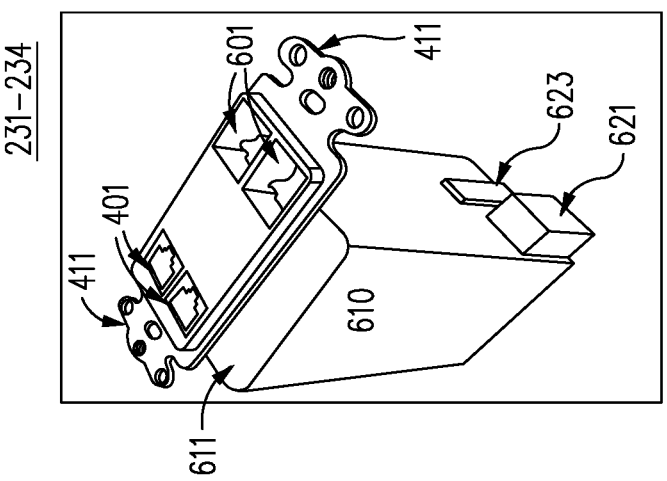
FIG. 6B shows one embodiment of a two standard RJ-45 port integrated converter/receiver in-wall mounted data access station of FIGS. 4 and 4B in more detail, in accordance with one embodiment.
Figure 6A:
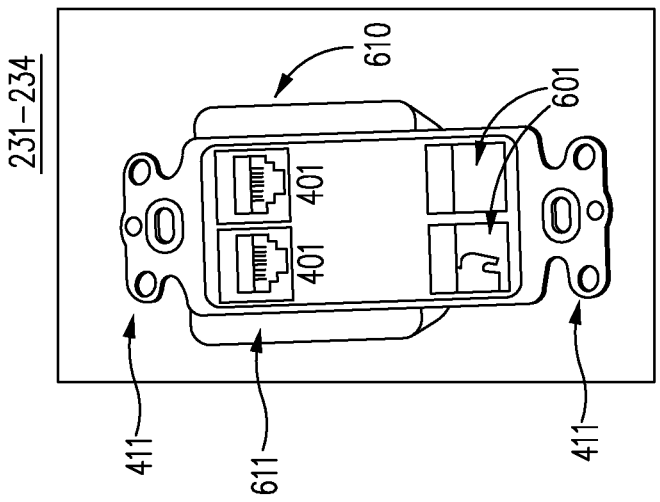
FIG. 6A shows one embodiment of a two standard RJ-45 port integrated converter/receiver in-wall mounted data access station of FIGS. 4 and 4B in more detail, in accordance with one embodiment.
Figure 6F:
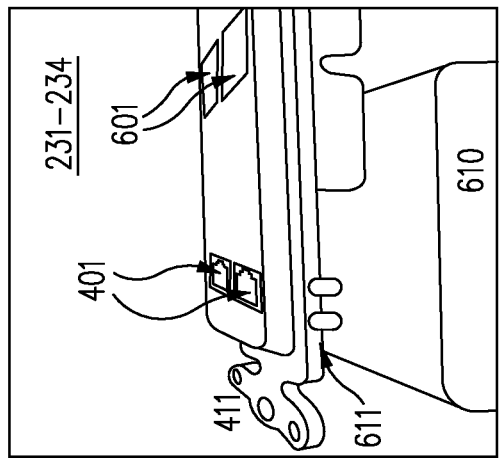
FIG. 6F shows one embodiment of a two standard RJ-45 port integrated converter/receiver in-wall mounted data access station of FIGS. 4 and 4B in more detail, in accordance with one embodiment.
Figure 6E:
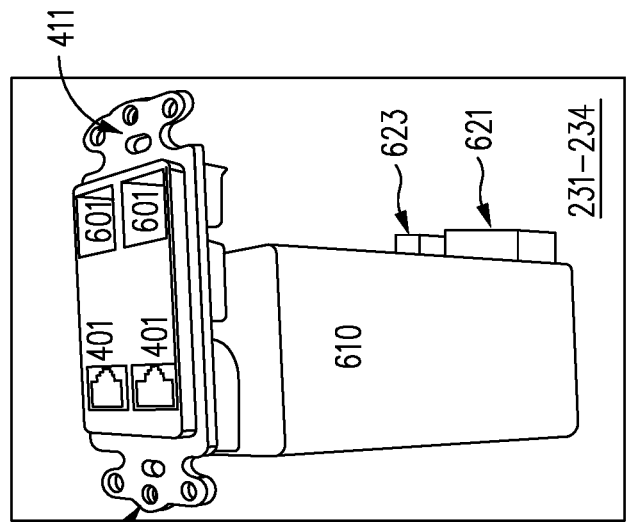
FIG. 6E shows one embodiment of a two standard RJ-45 port integrated converter/receiver in-wall mounted data access station of FIGS. 4 and 4B in more detail, in accordance with one embodiment.
Figure 6D:
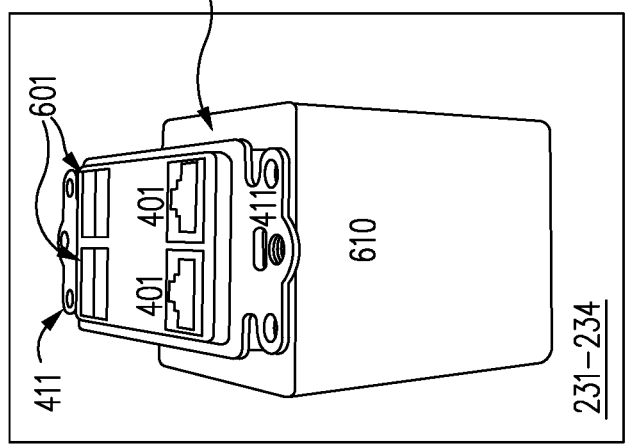
FIG. 6D shows one embodiment of a two standard RJ-45 port integrated converter/receiver in-wall mounted data access station of FIGS. 4 and 4B in more detail, in accordance with one embodiment.
Figure 6H:
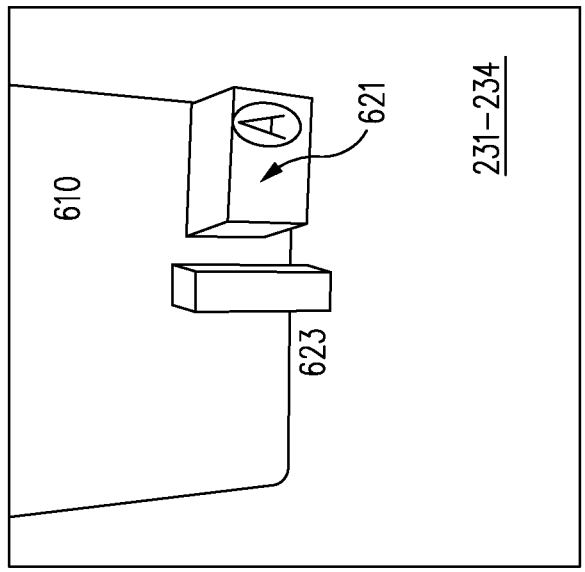
FIG. 6H shows one embodiment of a two standard RJ-45 port integrated converter/receiver in-wall mounted data access station of FIGS. 4 and 4B in more detail, in accordance with one embodiment.
Figure 6G:
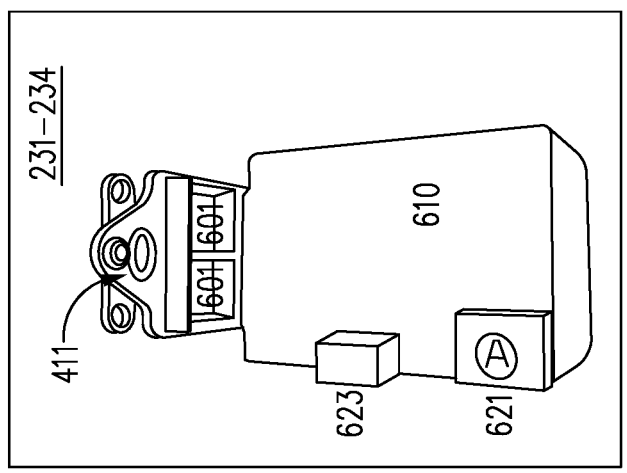
FIG. 6G shows one embodiment of a two standard RJ-45 port integrated converter/receiver in-wall mounted data access station of FIGS. 4 and 4B in more detail, in accordance with one embodiment.

Similarly, converter/receiver in-wall mounted data access stations power converter 220 converts the 120V power to 12V power and provides 12V power to each of disclosed integrated converter/receiver in-wall mounted data access stations 231, 232, 233, 234, 241, 242, 243, and 244, via low voltage power lines 221, 222, 223, 224, 225, 226, 227, and 228, respectively. The provided 12V low voltage power is used by integrated converter/receiver in-wall mounted data access stations 231, 232, 233, 234, 241, 242, 243, and 244 for powering integrated OD to TDD converters/receivers (not shown in FIG. 2, see FIGS. 6A through 6H and 7B through 8) of integrated converter/receiver in-wall mounted data access stations 231, 232, 233, 234, 241, 242, 243, and 244 and/or to power status lights, such as LEDs (not shown in FIG. 2, see FIGS. 6E and 6F) used for diagnostics and status monitoring of integrated converter/receiver in-wall mounted data access stations 231, 232, 233, 234, 241, 242, 243, and 244.

Those of skill in the art will recognize that the placement of power supply 205 and/or converter/receiver in-wall mounted data access stations power converter 220 outside of multi-port Ethernet fiber switch 209 in the specific illustrative example of one embodiment in FIG. 2 is indeed made for illustrative purposes only. In other embodiments, multi-port Ethernet fiber switch power supply 205 and/or converter/receiver in-wall mounted data access stations power converter 220 could be part of, or included within, multi-port Ethernet fiber switch 209 and/or any of integrated converter/receiver in-wall mounted data access stations 231, 232, 233, 234, 241, 242, 243, and 244.

Returning to FIG. 2, as discussed above, according to embodiments disclosed herein, TDD is provided to a router 201 from an ISP or intermediate station at 299, as discussed in more detail above. Router 201 then provides the TDD to multi-port Ethernet fiber switch 209 at Ethernet connector 203 via single Ethernet line 202. As seen in FIG. 2, multi-port Ethernet fiber switch 209 includes multi-port Ethernet fiber switch ports, in this specific example eight multi-port Ethernet fiber switch ports 251 through 258.

Returning to FIG. 2, the OD converted from TDD by multi-port Ethernet fiber switch 209 is then transmitted to multiple integrated converter/receiver in-wall mounted data access stations 231, 232, 233, 234, 241, 242, 243, 244 through the multiple optical lines 211 through 218.

In one embodiment, one or more of optical lines 211 through 218 are single mode fiber lines. In some embodiments, one or more of optical lines 211 through 218 are multi-mode fiber lines.

Those of skill in the art will recognize that the purely illustrative choice of a multi-port Ethernet fiber switch with eight multi-port Ethernet fiber switch ports 251 through 258 and eight optical lines 211 through 218 was indeed made for illustrative purposes only and that any number of multi-port Ethernet fiber switch ports and/or optical lines can be accommodated by various embodiments of the disclosed multi-port Ethernet fiber switch. In addition, in some cases the number of multi-port Ethernet fiber switch ports provided does not correspond to the number of optical lines used to transmit OD. That is to say, in some cases, not all multi-port Ethernet fiber switch ports are used in a given implementation so that the number of optical lines is less than the number of multi-port Ethernet fiber switch ports provided. Consequently, subsequent room for growth and expansion is provided.

In addition, numerous types and configurations of multi-port Ethernet fiber switches are known and can be used with the disclosed methods and systems. Consequently, a more detailed discussion of the operation of a specific example of any multi-port Ethernet fiber switch is omitted here to avoid detracting from the invention.

As discussed in more detail below, in one embodiment, each integrated converter/receiver in-wall mounted data access station 231, 232, 233, 234, 241, 242, 243, 244 includes an integrated OD to TDD converter/receiver (not shown in FIG. 2, see FIGS. 6A through 6H and 7B through 8) that, in one embodiment, can be situated in a cavity in the wall in which the integrated converter/receiver in-wall mounted data access stations 231, 232, 233, 234, 241, 242, 243, 244 reside (see FIGS. 9A through 9D below). In addition, in one embodiment, each integrated converter/receiver in-wall mounted data access station 231, 232, 233, 234, 241, 242, 243, 244 includes one or more data ports, such as standard RJ-45 ports.

As also discussed in more detail below, in some embodiments, the integrated converter/receiver in-wall mounted data access stations, such as integrated converter/receiver in-wall mounted data access stations 231, 232, 233, and 234, include two (or more) standard RJ-45 ports. In some embodiments, the integrated converter/receiver in-wall mounted data access stations, such as integrated converter/receiver in-wall mounted data access stations 241, 242, 243, and 244 include four (or more) standard RJ-45 ports.

Those of skill in the art will recognize that the choice of four integrated converter/receiver in-wall mounted data access stations 231, 232, 233, and 234 that include two standard RJ-45 ports is made for illustrative purposes only. In various embodiments, any number of integrated converter/receiver in-wall mounted data access with two (or more) standard RJ-45 ports could be used. In addition, the choice of two standard RJ-45 ports for integrated converter/receiver in-wall mounted data access stations 231, 232, 233, and 234 was also made for illustrative purposes only and that in various embodiments any number of RJ-45 ports can be provided at each integrated converter/receiver in-wall mounted data access station.

Likewise, those of skill in the art will recognize that the choice of four integrated converter/receiver in-wall mounted data access stations 241, 242, 243, and 244 that include four standard RJ-45 ports is also made for illustrative purposes only. In various embodiments, any number of integrated converter/receiver in-wall mounted data access with four (or more) standard RJ-45 ports could be used. In addition, the choice of four standard RJ-45 ports for integrated converter/receiver in-wall mounted data access stations 241, 242, 243, and 244 was also made for illustrative purposes only and that in various embodiments any number of RJ-45 ports can be provided at each integrated converter/receiver in-wall mounted data access station.

Using the one example of data network 200 including a multi-port Ethernet fiber switch and integrated converter/receiver in-wall mounted data access stations of FIG. 2, a single multi-port Ethernet fiber switch 209 can convert TDD to OD and provide the OD on eight multi-port Ethernet fiber switch ports 251 through 258 for transmission to multiple integrated converter/receiver in-wall mounted data access stations 231, 232, 233, 234, 241, 242, 243, 244. In addition, each integrated converter/receiver in-wall mounted data access station 231, 232, 233, 234, 241, 242, 243, 244 can convert the OD to TDD and provide TDD on multiple data ports, such as standard RJ-45 ports, at the point of need, anywhere in the structure, using OD to TDD converter/receivers that can be neatly concealed in a wall. In this particular example, two standard RJ-45 ports are provided by each of integrated converter/receiver in-wall mounted data access stations 231, 232, 233, 234, and four standard RJ-45 ports are provided by each of integrated converter/receiver in-wall mounted data access stations 241, 242, 243, 244 for a total of, in this very specific illustrative example of FIG. 2, twenty-four standard RJ-45 ports capable of supporting 24 separate Internets devices at eight separate locations.

Consequently, in this specific example, the equipment required to provide Internet to twenty-four Internet devices would include one router 201, one disclosed multi-port Ethernet fiber switch 209, eight optical lines 211 through 218, eight low voltage in wall power lines 221-228, and eight integrated converter/receiver in-wall mounted data access stations 231 through 234 and 241 through 244. In addition, since optical lines 211 through 218 are used, the OD can be provided to eight separate locations as far away from the disclosed multi-port Ethernet fiber switch 209 as desired and the disclosed integrated converter/receiver in-wall mounted data access stations 231 through 234 and 241 through 244, including the OD to TDD converters/receivers, can be hidden in the wall and out of the way.

In contrast, as noted, using traditional Ethernet TDD systems, connecting twenty-four Internet devices would require a router and twenty-four separate TDD Ethernet lines. In addition, the separate TDD Ethernet lines could only be used for distances of one hundred meters or less. Likewise, if traditional optical systems were used to connect the same twenty-four Internet devices, this would require a router, twenty-four TDD to OD converters/transmitters, twenty-four optical lines, and twenty-four OD to TDD converters/receivers. In addition, desk or wall space would be required for forty-eight devices, i.e., each of the twenty-four TDD to OD converters/transmitters and each of the twenty-four OD to TDD converters/receivers.

Figure 3A:
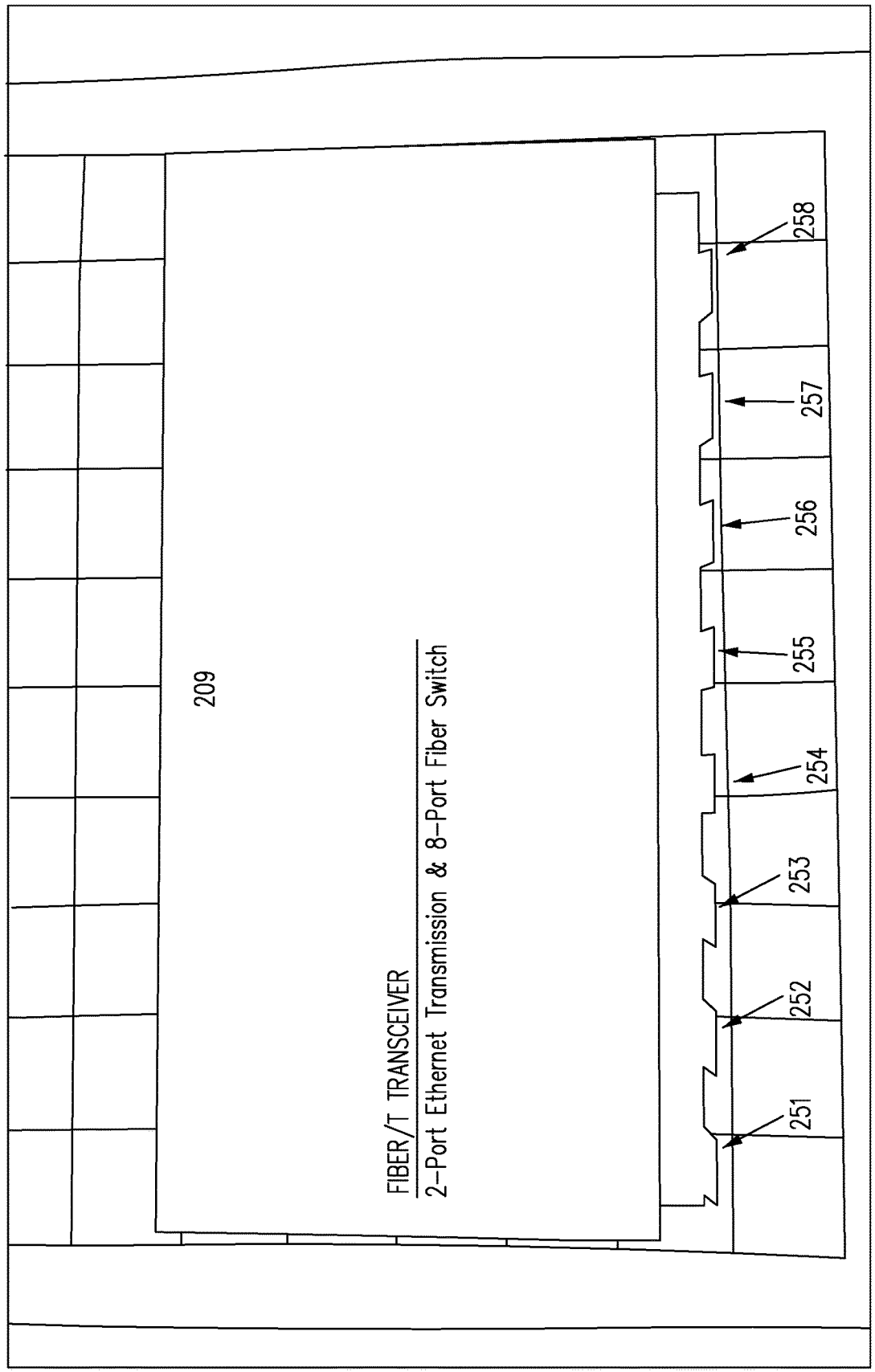
FIG. 3A shows an overhead view of an exemplary multi-port Ethernet fiber switch in accordance with one embodiment.
Figure 3B:
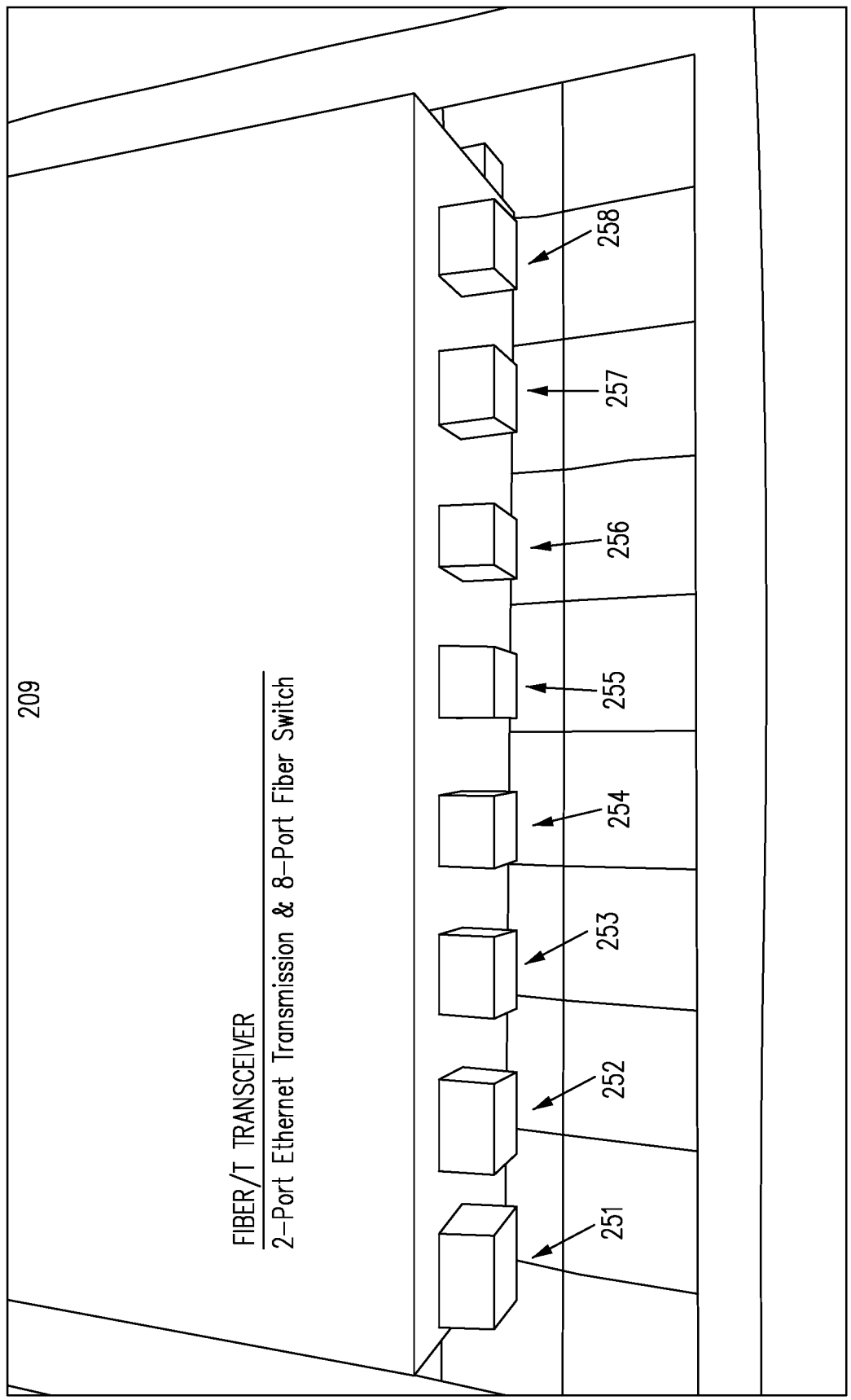
FIG. 3B shows a perspective view of the exemplary embodiment of the multi-port Ethernet fiber switch of FIG. 3A including fiber connections F1 through F8 in accordance with one embodiment.
Figure 3C:
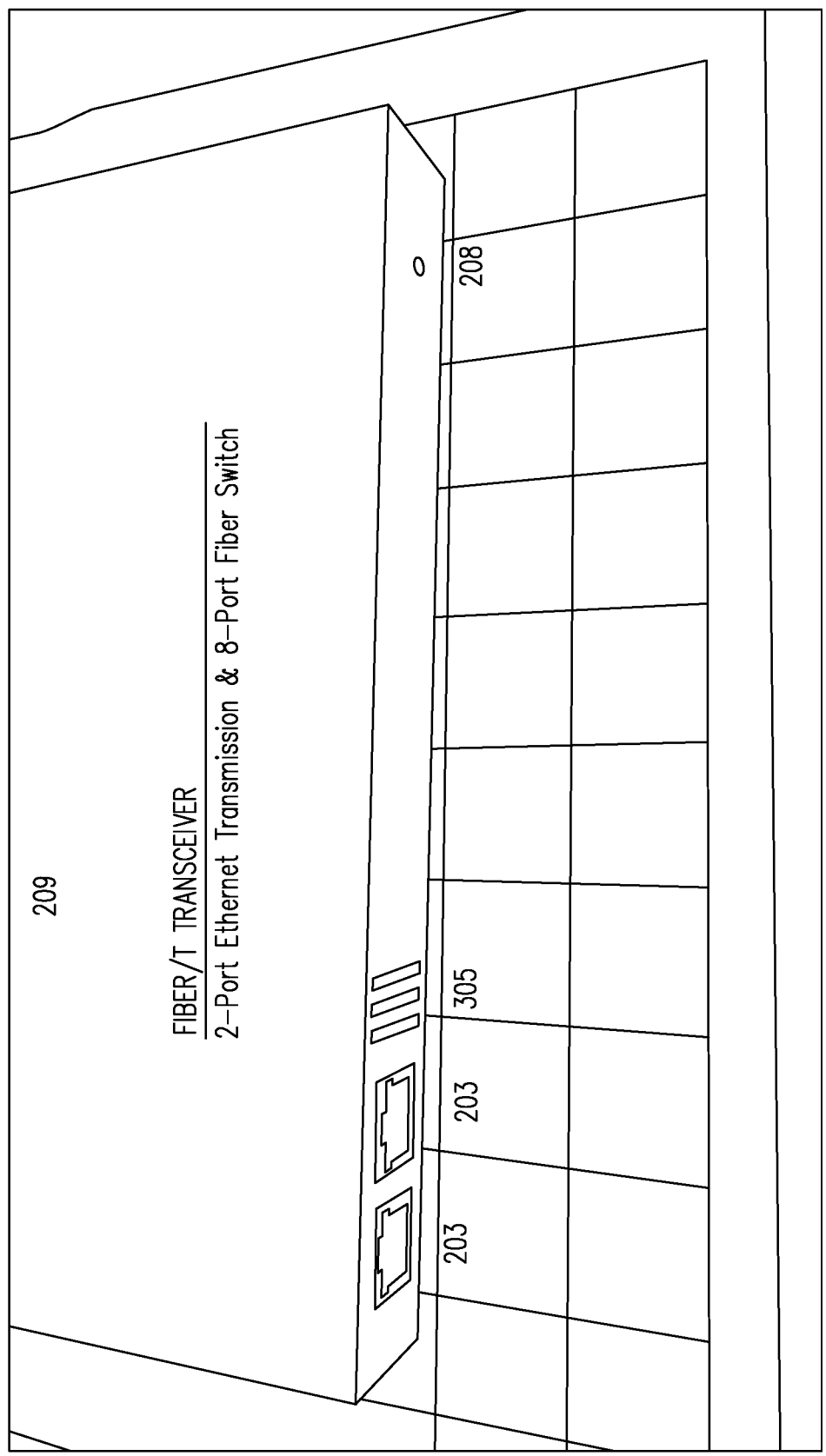
FIG. 3C shows a perspective view of the exemplary embodiment of the exemplary multi-port Ethernet fiber switch of FIG. 3A including Ethernet ports in accordance with one embodiment.

FIGS. 3A, 3B, and 3C show various views of one example of an exemplary multi-port Ethernet fiber switch 209 in accordance with one embodiment. In particular, FIG. 3A shows an overhead view of an exemplary embodiment of a multi-port Ethernet fiber switch 209 including eight fiber connections 251 through 258 for the eight optical lines 211 through 218 of FIG. 2.

FIG. 3B shows a perspective view of the exemplary embodiment of the exemplary multi-port Ethernet fiber switch 209 of FIG. 3A including the eight fiber connections 251 through 258, labeled F1 through F8, in more detail.

FIG. 3C shows a perspective view of the exemplary embodiment of the exemplary multi-port Ethernet fiber switch 209 of FIG. 3A including Ethernet connector 203, status lights 305 and power connector 208.

Again, those of skill in the art will readily recognize that the illustrated choice of eight fiber connections 251 through 258 for the specific illustrative example of an exemplary multi-port Ethernet fiber switch 209 of FIGS. 2, 3A, 3B, and 3C was made for simplicity of illustration and example. In various other embodiments, any number fiber connections desired can be included/provided in other embodiments of multi-port Ethernet fiber switches.

In one embodiment, multi-port Ethernet fiber switch 209 includes side tabs (not shown) for wall mounting. The exterior dimensions of multi-port Ethernet fiber switch 209 are not critical and therefore multi-port Ethernet fiber switch 209 can use standardized metal housing, or any housing material or size desired.

As noted, in accordance with one embodiment, the disclosed multi-port Ethernet fiber switch 209 converts the TDD to OD and then provides the OD to each of the multi-port Ethernet fiber switch ports 251 through 258 for transmission on optical lines, in this specific illustrative example the eight optical lines 211 through 218 connected to the multi-port Ethernet fiber switch ports 251 through 258, respectively. Consequently, the disclosed multi-port Ethernet fiber switch 209 converts the TDD to OD in a single conversion, and via a single device, and then provides the OD to multiple optical lines, optical lines 211 through 218, all within the single multi-port Ethernet fiber switch 209.

Figure 3D:
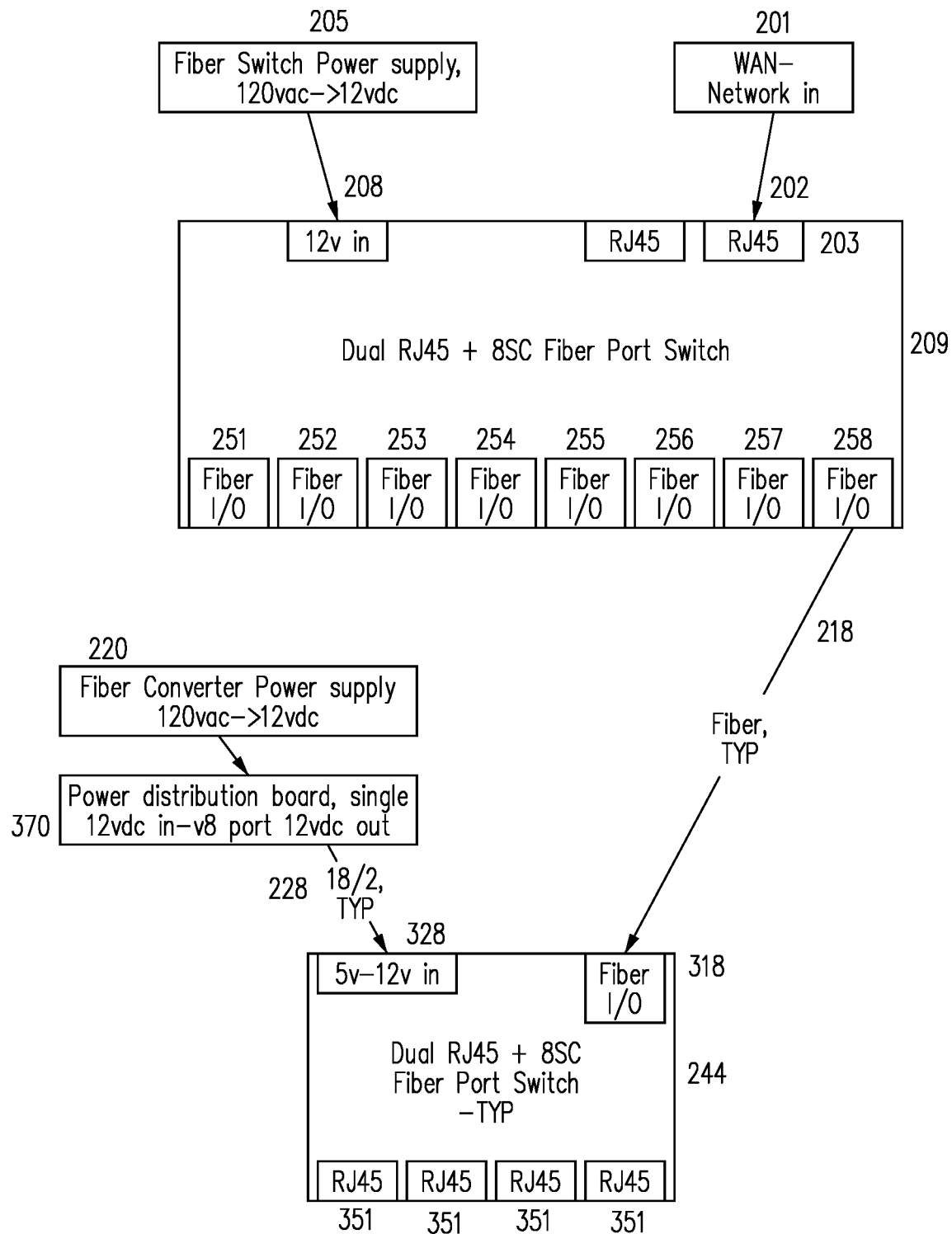
FIG. 3D shows a simplified schematic connection diagram of some of the components of the disclosed data network including a multi-port Ethernet fiber switch and integrated converter/receiver in-wall mounted data access stations of FIG. 2 in accordance with one embodiment.

FIG. 3D shows a simplified schematic connection diagram of some of the components of the data network 200 including a multi-port Ethernet fiber switch and an exemplary integrated converter/receiver in-wall mounted data access stations in accordance with one embodiment.

Referring to FIGS. 2, 3A, 3B, 3C, and FIG. 3D, in one embodiment, standard 120V high voltage power is provided from power source 207 to multi-port Ethernet fiber switch power supply 205 and converter/receiver in-wall mounted data access stations power converter 220. Multi-port Ethernet fiber switch power supply 205 then converts the 120V power to 12V power and provides the 12V power to multi-port Ethernet fiber switch 209 at connector 208.

Similarly, converter/receiver in-wall mounted data access stations power converter 220 converts the 120V power to 12V power and provides 12V power to each of integrated converter/receiver in-wall mounted data access stations 231, 232, 233, 234, 241, 242, 243, and 244, via low voltage power lines 221, 222, 223, 224, 225, 226, 227, and 228, respectively.

In particular, in FIG. 3D, converter/receiver in-wall mounted data access stations power converter 220 converts the 120V power to 12V power and provides 12V power to converter/receiver in-wall mounted data access station 244 via low voltage power line 228 and connector 328.

The provided 12V low voltage power is used by integrated converter/receiver in-wall mounted data access stations 231, 232, 233, 234, 241, 242, 243, and 244 for powering the integrated OD to TDD converters/receivers of integrated converter/receiver in-wall mounted data access stations 231, 232, 233, 234, 241, 242, 243, and 244 and/or to power status lights, such as LEDs used for diagnostics and status monitoring of integrated converter/receiver in-wall mounted data access stations 231, 232, 233, 234, 241, 242, 243, and 244.

In particular, in FIG. 3D, converter/receiver in-wall mounted data access stations power converter 220 converts the 120V power to 12V power and provides 12V power to converter/receiver in-wall mounted data access station 244 via low voltage power line 228 and connector 328.

Figure 3E:
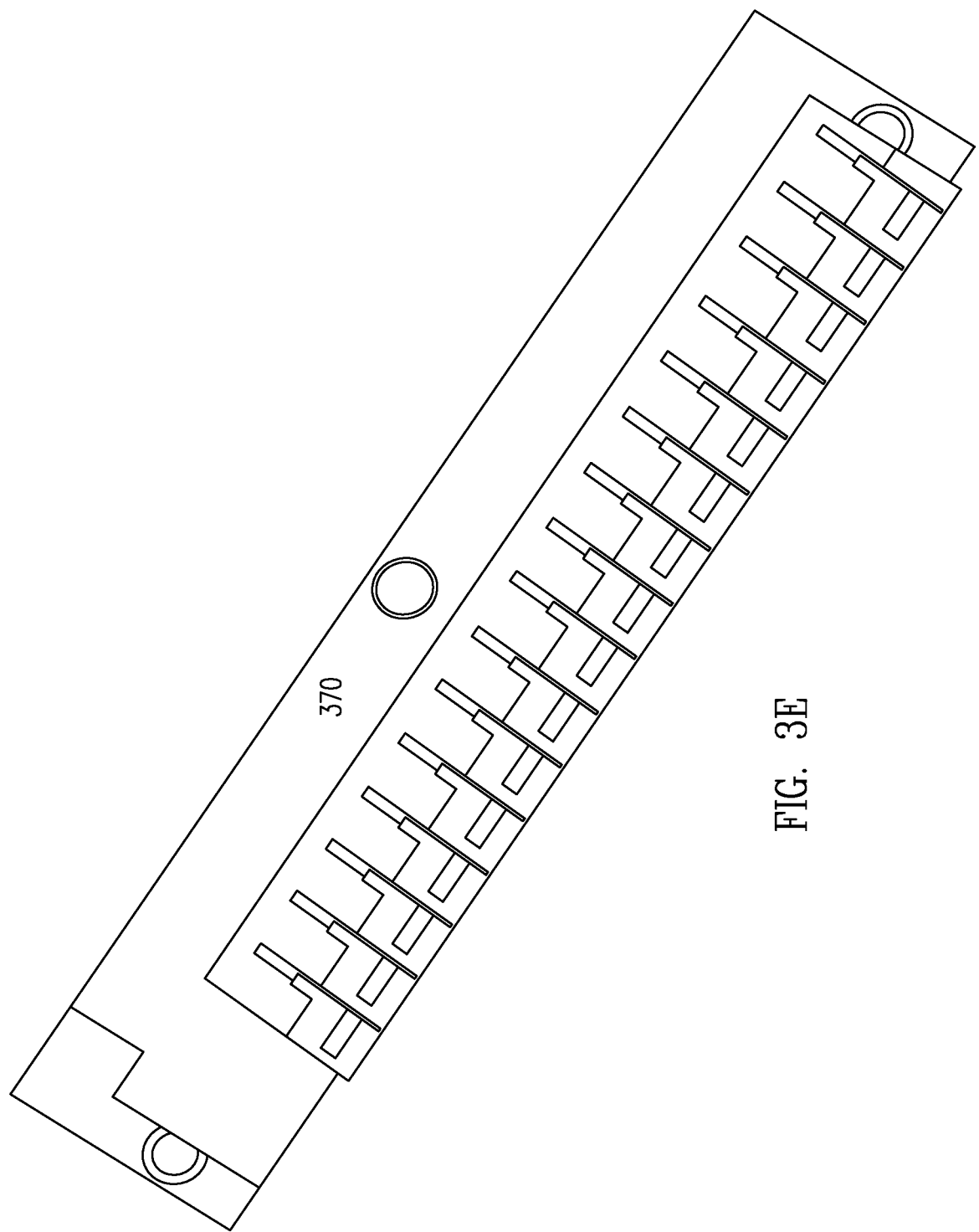
FIG. 3E shows an exemplary power distribution device in accordance with one embodiment.

In one embodiment, converter/receiver in-wall mounted data access stations power converter 220 utilizes a power distribution unit. FIG. 3E shows one illustrative example of a power distribution unit 370. Power distribution units, such a power distribution unit 370, are well known in the art. Consequently, a more detailed discussion of the structure and operation of power distribution unit 370 is omitted here to avoid detracting from the invention.

As seen in FIG. 3D, as an illustrative example, 12V power is provided from power distribution unit 370 to integrated converter/receiver in-wall mounted data access station 244 at 12V input connection 328.

Referring again to FIGS. 2, 3A, 3B, 3C, and FIG. 3D, as discussed above, according to embodiments disclosed herein, TDD is provided to a router 201 from an ISP or intermediate station at 299, as discussed in more detail above. Router 201 then provides the TDD to multi-port Ethernet fiber switch 209 via Ethernet line 202 and RJ 45 Ethernet connector 203. As seen in FIG. 2, multi-port Ethernet fiber switch 209 includes multi-port Ethernet fiber switch ports, in this specific example eight multi-port Ethernet fiber switch ports 251 through 258.

In the particular example of FIG. 3D, multi-port Ethernet fiber switch port 258 then provides OD to integrated converter/receiver in-wall mounted data access station 244 via optical line 218 and input connector 318.

As discussed above and below, each integrated converter/receiver in-wall mounted data access station 231, 232, 233, 234, 241, 242, 243, 244 includes an integrated OD to TDD converter/receiver (not shown in FIG. 3D, see FIGS. 6A through 6H and 7B through 8) that, in one embodiment, can be situated in a cavity in the wall in which the integrated converter/receiver in-wall mounted data access stations 231, 232, 233, 234, 241, 242, 243, 244 reside. In addition, in one embodiment, each integrated converter/receiver in-wall mounted data access station 231, 232, 233, 234, 241, 242, 243, 244 includes one or more data ports, such as standard RJ-45 ports.

Returning to FIG. 3D, the OD provided to integrated converter/receiver in-wall mounted data access station 244 via optical line 218 and input connector 318 is then converted to TDD by the integrated OD to TDD converter/receiver (not shown in FIG. 2, see FIGS. 6A through 6H and 7B through 8) and the TDD is then provided at standard RJ-45 ports 351.

As also discussed in more detail below, in some embodiments, some integrated converter/receiver in-wall mounted data access stations, such as integrated converter/receiver in-wall mounted data access stations 231, 232, 233, and 234, include two (or more) standard RJ-45 ports. In some embodiments, the integrated converter/receiver in-wall mounted data access stations, such as integrated converter/receiver in-wall mounted data access stations 241, 242, 243, and 244 include four (or more) standard RJ-45 ports.

Figure 4:
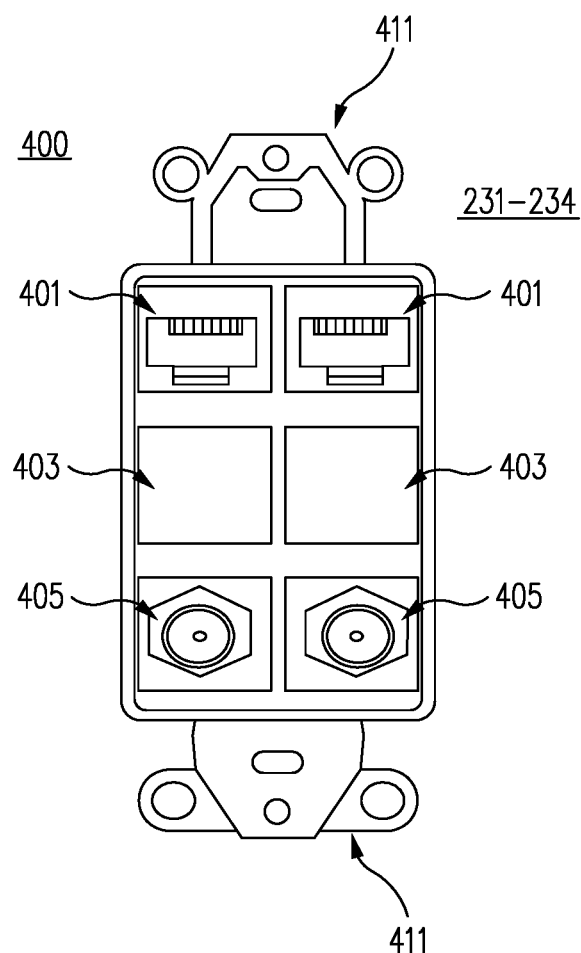
FIG. 4 shows one embodiment of a two standard RJ-45 port integrated converter/receiver in-wall mounted data access station of FIG. 2 in more detail, in accordance with one embodiment.

FIG. 4 shows one embodiment of a two standard RJ-45 port integrated converter/receiver in-wall mounted data access station 400, such as integrated converter/receiver in-wall mounted data access stations 231, 232, 233, and 234 of FIG. 2, in more detail, in accordance with one embodiment.

As seen in FIG. 4, in one illustrative embodiment, each of integrated converter/receiver in-wall mounted data access stations 231-234 includes standard RJ-45 ports 401, two keystone cut/punch outs 403, and two coaxial data connectors 405.

Those of skill in the art will recognize that the choice of two standard RJ-45 ports 401, two keystone cut/punch outs 403, and two coaxial data connectors 405, was made for illustrative purposes only. In other embodiments, any number of standard RJ-45 ports 401, including as few as one, any number of keystone cut/punch outs 403, including none, and any number of coaxial data connectors 405, including none, could be included in integrated converter/receiver in-wall mounted data access stations 231-234.

As also seen in FIG. 4, integrated converter/receiver in-wall mounted data access stations 231-234 include mounting portions 411 that allow integrated converter/receiver in-wall mounted data access stations 231-234 to be mounted in a wall in a manner very similar to standard in-wall electrical outlets (see FIGS. 9A to 9E).

In one embodiment, the two standard RJ-45 port integrated converter/receiver in-wall mounted data access station of FIG. 4 is a 1000 mb Single Mode Fiber to dual (2) RJ-45 Converter.

In one embodiment, the two standard RJ-45 port integrated converter/receiver in-wall mounted data access station of FIG. 4 is dimensioned to fit into a standard in wall mounting system such as a USA single gang electrical box or low voltage mounting ring. In one embodiment, the two standard RJ-45 port integrated converter/receiver in-wall mounted data access station of FIG. 4 has the following dimensions: a height of 70 mm, a width of 52 mm, and a depth of 60 mm (see FIGS. 7A, 7B, and 9A to 9E).

Figure 5:
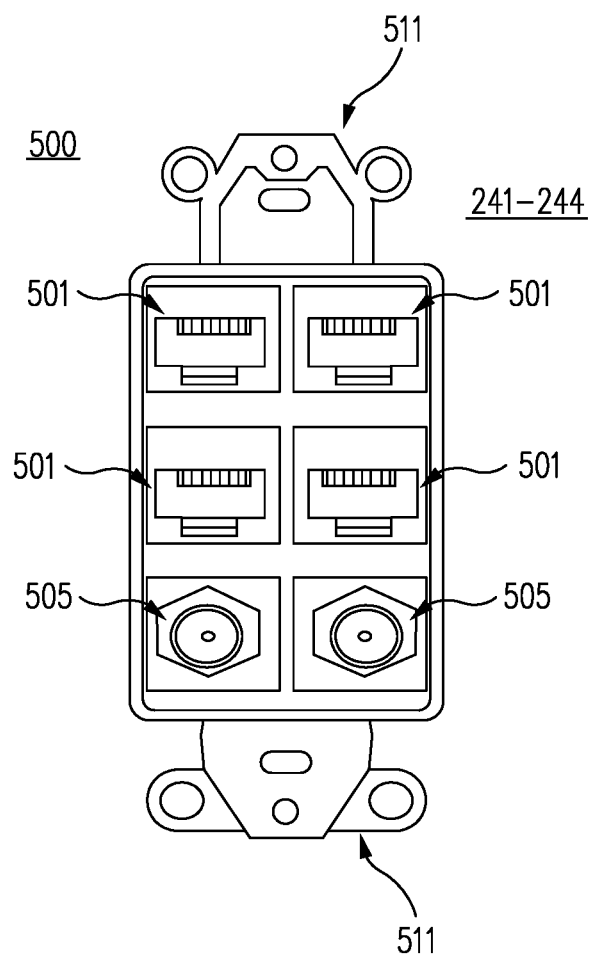
FIG. 5 shows one embodiment of a four standard RJ-45 port integrated converter/receiver in-wall mounted data access station of FIG. 2 in more detail, in accordance with one embodiment.

FIG. 5 shows one embodiment of a four standard RJ-45 port integrated converter/receiver in-wall mounted data access station 500, such as integrated converter/receiver in-wall mounted data access stations 241, 242, 243, and 244 of FIG. 2, in more detail, in accordance with one embodiment.

As seen in FIG. 5, in one embodiment, each of integrated converter/receiver in-wall mounted data access stations 241-244 includes four standard RJ-45 ports 501 and two coaxial data connectors 505.

Those of skill in the art will recognize that the choice of four standard RJ-45 ports 501 and two coaxial data connectors 505 was made for illustrative purposes only. In other embodiments, any number of standard RJ-45 ports 501, including only one, and coaxial data connectors 505, including none, could be included in integrated converter/receiver in-wall mounted data access stations 241-244. In addition, in other embodiments, keystone cut/punch outs, such as keystone cut/punch outs 403 of FIG. 4, could be substituted for coaxial data connectors 505 and these keystone cut/punch outs could be used for any type of data and/or use normally accommodated by keystone cut/punch outs.

As also seen in FIG. 5, integrated converter/receiver in-wall mounted data access stations 241-244 include mounting portions 511 that allow integrated converter/receiver in-wall mounted data access stations 241-244 to be mounted in a wall in a manner very similar to standard in-wall electrical outlets (see FIGS. 9A to 9E).

In one embodiment, the four standard RJ-45 port integrated converter/receiver in-wall mounted data access station of FIG. 5 is a 1000 mb Single Mode Fiber to dual (4) RJ-45 converter.

In one embodiment, the four standard RJ-45 port integrated converter/receiver in-wall mounted data access station of FIG. 5 is dimensioned to fit into a standard in wall mounting system, such as a USA single gang electrical box or low voltage mounting ring. In one embodiment, the four standard RJ-45 port integrated converter/receiver in-wall mounted data access station of FIG. 5 has the following dimensions: a height of 70 mm, a width of 52 mm, and a depth of 60 mm (see FIGS. 7A, 7B, and 9A to 9E).

FIGS. 6A through 6H show another embodiment of a two standard RJ-45 port integrated converter/receiver in-wall mounted data access stations, such as integrated converter/receiver in-wall mounted data access stations 231-234 of FIG. 2 and FIG. 4, in more detail, in accordance with one embodiment.

As seen in FIGS. 6A through 6H, in this embodiment, integrated converter/receiver in-wall mounted data access stations 231-234 include standard RJ-45 ports 401 and keystone cut/punch outs 601. In this embodiment there are no coaxial data connectors. Also shown are attachment portions 411.

Also shown in FIGS. 6A through 6H is integrated OD to TDD converter/receiver 610. As discussed above, referring to FIGS. 2 and 6A through 6H, the OD converted from TDD by multi-port Ethernet fiber switch 209 is transmitted to multiple integrated converter/receiver in-wall mounted data access stations 231, 232, 233, 234, 241, 242, 243, 244 through the multiple optical lines, such as optical lines 211 through 218.

In one embodiment, each integrated converter/receiver in-wall mounted data access station 231, 232, 233, 234, 241, 242, 243, 244 includes an integrated OD to TDD converter/receiver 610 that, in one embodiment, can be situated in a cavity in the wall in which the integrated converter/receiver in-wall mounted data access stations 231, 232, 233, 234, 241, 242, 243, 244 reside using mounting portions 411 (see FIGS. 9A through 9E). In addition, in one embodiment, each integrated converter/receiver in-wall mounted data access station 231, 232, 233, 234, 241, 242, 243, 244 includes one or more data ports, such as standard RJ-45 ports 401.

Consequently, OD to TDD converter/receiver 610 converts OD to TDD and then provides the TDD at each of standard RJ-45 ports 401.

As seen in FIGS. 6B, 6E, 6G and 6H, OD to TDD converter/receiver 610 includes power jack 623 and OD input port 621. As seen in FIGS. 6A, 6B, 6D, 6E, and 6F, OD to TDD converter/receiver 610 also includes LED status lights 611.

Referring to FIGS. 2 and 6A through 6H, 120V high voltage power is provided from power source 207 to multi-port Ethernet fiber switch power supply 205 and converter/receiver in-wall mounted data access stations power converter 220. Multi-port Ethernet fiber switch power supply 205 then converts the 120V power to 12V power and provides the 12V power to multi-port Ethernet fiber switch 209 at connector 208.

Similarly, converter/receiver in-wall mounted data access stations power converter 220 converts the 120V power to 12V power and provides 12V power to each of integrated converter/receiver in-wall mounted data access stations 231, 232, 233, 234, 241, 242, 243, and 244, via low voltage power lines 221, 222, 223, 224, 225, 226, 227, and 228, respectively, at a power connector 623 on each of integrated converter/receiver in-wall mounted data access stations 231, 232, 233, 234, 241, 242, 243, and 244.

The provided 12V low voltage power is used by integrated converter/receiver in-wall mounted data access stations 231, 232, 233, 234, 241, 242, 243, and 244 for powering the integrated OD to TDD converters/receivers of integrated converter/receiver in-wall mounted data access stations 231, 232, 233, 234, 241, 242, 243, and 244 and/or to power status lights, such as LEDs 611, used for diagnostics and status monitoring of integrated converter/receiver in-wall mounted data access stations 231, 232, 233, 234, 241, 242, 243, and 244.

In addition, as noted, the OD converted from TDD by multi-port Ethernet fiber switch 209 is transmitted to multiple integrated converter/receiver in-wall mounted data access stations 231, 232, 233, 234, 241, 242, 243, 244 through the multiple optical lines, such as optical lines 211 through 218. The OD is then provided to each of integrated converter/receiver in-wall mounted data access stations 231, 232, 233, 234, 241, 242, 243, and 244 via an OD input port 621 included on the integrated OD to TDD converter/receiver 610 of each integrated converter/receiver in-wall mounted data access stations 231, 232, 233, 234, 241, 242, 243, and 244.

FIGS. 7A through 7H show another embodiment of a four standard RJ-45 port integrated converter/receiver in-wall mounted data access station 700, such as integrated converter/receiver in-wall mounted data access stations 1031, 1032, 1033, 1034, 1041, 1042, 1043, and 1044 discussed below with respect to FIG. 10, in accordance with one embodiment.

As seen in FIGS. 7A through 7H, in this embodiment, integrated converter/receiver in-wall mounted data access station 700 includes four standard RJ-45 ports 701-704.

Also shown in FIGS. 7A through 7H is integrated OD to TDD converter/receiver housing 710. As discussed in more detail, referring to FIGS. 10 and 7A through 7H, the OD converted from TDD by multi-port Ethernet fiber switch 209 is transmitted to multiple integrated converter/receiver in-wall mounted data access stations 1031, 1032, 1033, 1034, 1041, 1042, 1043, and 1044 through the multiple optical lines, such as optical lines 211 through 218.

In one embodiment, each integrated converter/receiver in-wall mounted data access station 1031, 1032, 1033, 1034, 1041, 1042, 1043, and 1044 includes an integrated converter/receiver 801 system (see FIG. 8) enclosed in housing 710 that, in one embodiment, is situated in a cavity in the wall in which the integrated converter/receiver in-wall mounted data access stations 1031, 1032, 1033, 1034, 1041, 1042, 1043, and 1044 reside using mounting portions 711 (see FIGS. 9A through 9E). In addition, in one embodiment, each integrated converter/receiver in-wall mounted data access station 1031, 1032, 1033, 1034, 1041, 1042, 1043, and 1044 includes one or more data ports, such as standard RJ-45 ports 701-704.

Consequently, integrated converter/receiver 801 system (see FIG. 8) in housing 710 converts OD to TDD and then provides the TDD at each of standard RJ-45 ports 701-704.

Figure 7A:
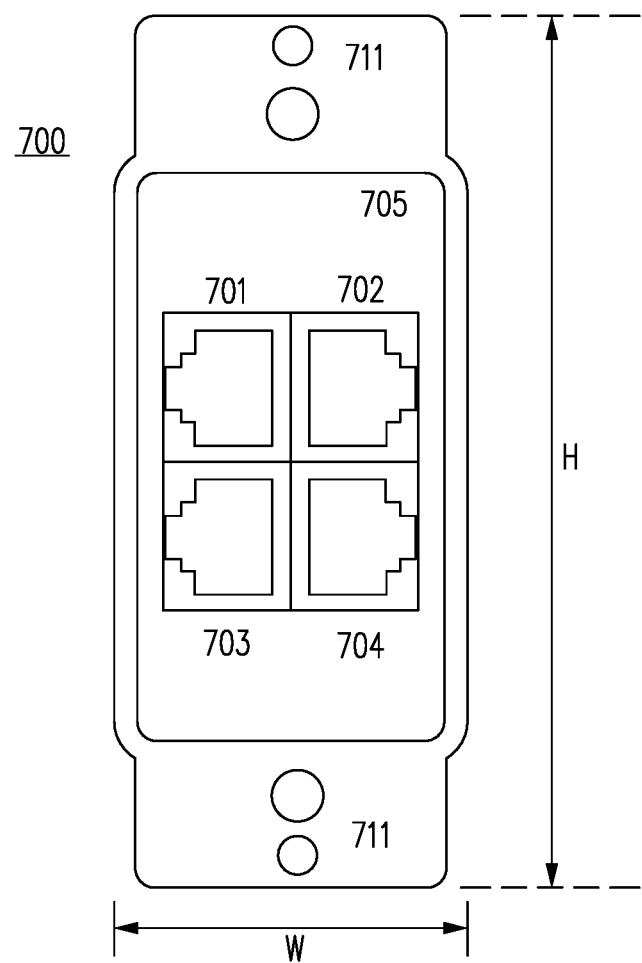
FIG. 7A shows one embodiment of a four standard RJ-45 port integrated converter/receiver in-wall mounted data access station in accordance with one embodiment.

In particular, FIG. 7A shows one embodiment of a four standard RJ-45 port integrated converter/receiver in-wall mounted data access station 700 in accordance with one embodiment.

FIG. 7A shows one embodiment of a four standard RJ-45 port integrated converter/receiver in-wall mounted data access station 700, such as integrated converter/receiver in-wall mounted data access stations 1031, 1032, 1033, 1034, 1041, 1042, 1043, and 1044 discussed below with respect to FIG. 10 in accordance with one embodiment.

As seen in FIG. 7A, in one illustrative embodiment, integrated converter/receiver in-wall mounted data access station 700 includes standard RJ-45 ports 701-704.

Those of skill in the art will recognize that the choice of four standard RJ-45 ports 701-704 was made for illustrative purposes only. In other embodiments, any number of standard RJ-45 ports 701-704, including as few as one, any number of keystone cut/punch outs, including none as shown, and any number of coaxial data connectors, including none as shown, could be included in integrated converter/receiver in-wall mounted data access station 700.

As also seen in FIG. 7A, integrated converter/receiver in-wall mounted data access station 700 includes mounting portions 711 that allow integrated converter/receiver in-wall mounted data access station 700 to be mounted in a wall in a manner very similar to standard in-wall electrical outlets (see FIGS. 9A through 9E).

In addition, in one embodiment, converter/receiver in-wall mounted data access station 700 includes removable face plate 705 that can be removed and/or replaced for color matching and/or painting.

In one embodiment, the four standard RJ-45 port integrated converter/receiver in-wall mounted data access station 700 of FIG. 7A is a 1000 mb Single Mode Fiber to quad (4) RJ-45 Converter.

In one embodiment, the four standard RJ-45 port integrated converter/receiver in-wall mounted data access station 700 of FIG. 7A is dimensioned to fit into a standard in wall mounting system such as a USA single gang electrical box or low voltage mounting ring. In one embodiment, the four standard RJ-45 port integrated converter/receiver in-wall mounted data access station 700 of FIG. 7A has the following dimensions: a height of 70 mm, a width of 52 mm, and a depth of 60 mm (see FIGS. 7A, 7B and 7C).

Figure 7B:
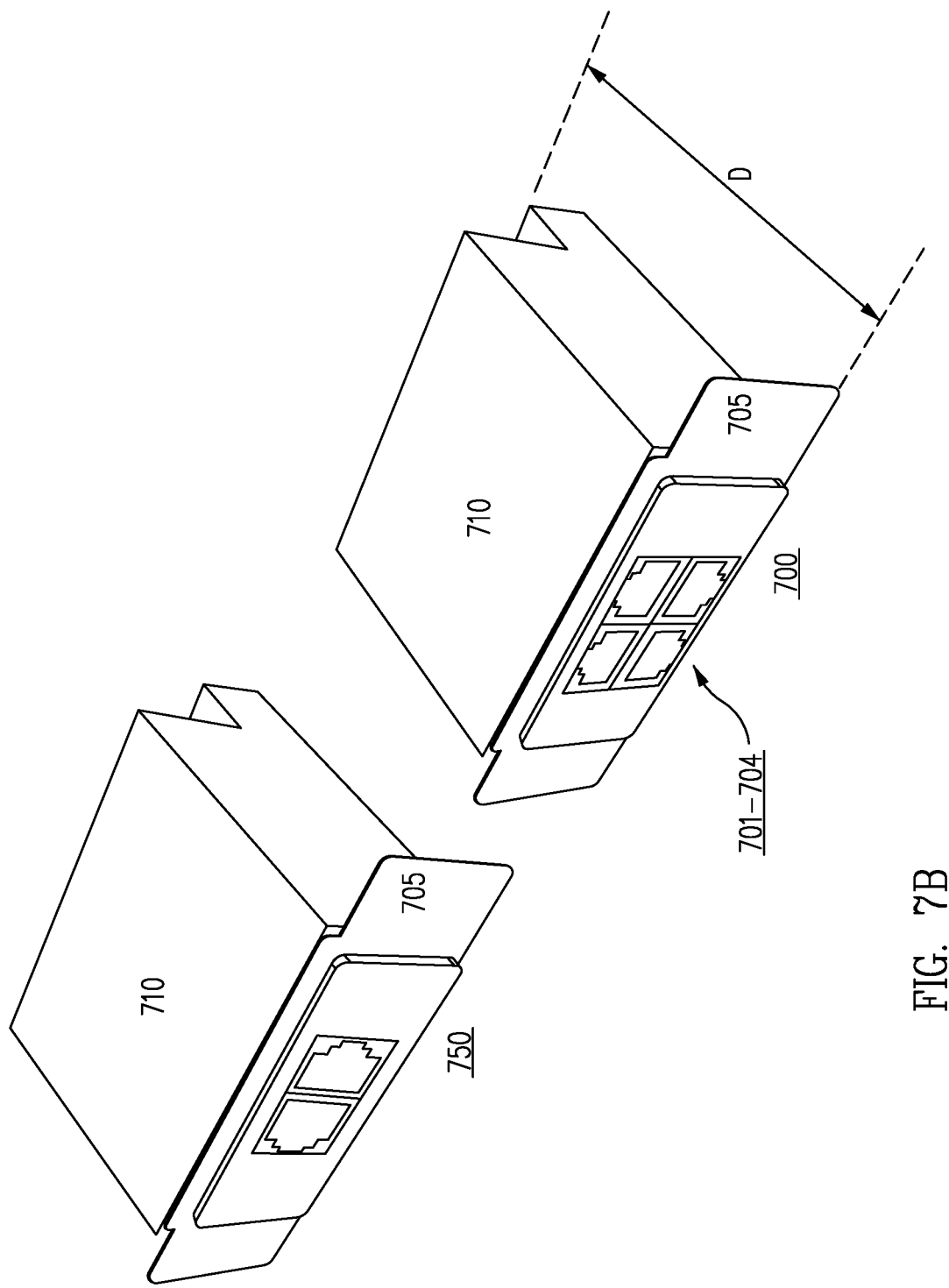
FIG. 7B shows a perspective view of embodiments of a two standard RJ-45 port integrated converter/receiver in-wall mounted data access station and a four standard RJ-45 port integrated converter/receiver in-wall mounted data access station in accordance with one embodiment.

FIG. 7B shows a perspective view of embodiments of a two standard RJ-45 port integrated converter/receiver in-wall mounted data access station 750 and a four standard RJ-45 port integrated converter/receiver in-wall mounted data access station 700 in accordance with one embodiment.

As seen in FIG. 7B, in one embodiment, both converter/receiver in-wall mounted data access station 700 and converter/receiver in-wall mounted data access station 750 include converter/receiver 801 system housing 710.

As seen in FIG. 7B, in one embodiment, in one embodiment, both converter/receiver in-wall mounted data access station 700 and converter/receiver in-wall mounted data access station 750 include removable face plate 705 that can be removed and/or replaced for color matching and/or painting.

Figure 1C:
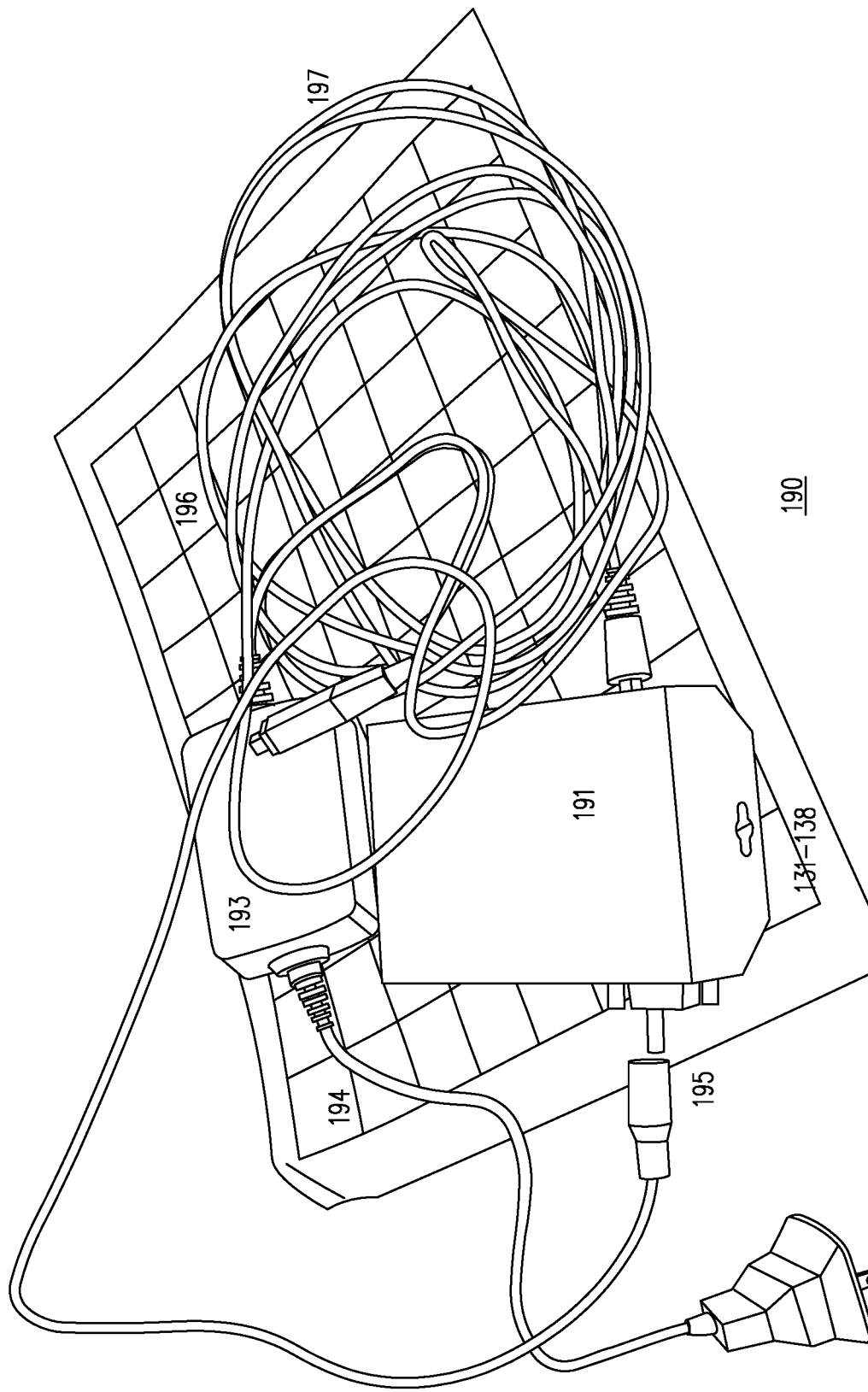
FIG. 1C shows a picture of one example of a single prior art OD to TDD Converter/Transmitter typically used with the hypothetical data/Internet distribution system of FIG. 1B that would result if prior art optical systems were used to transmit OD within a structure from point to point.
Figure 1D:
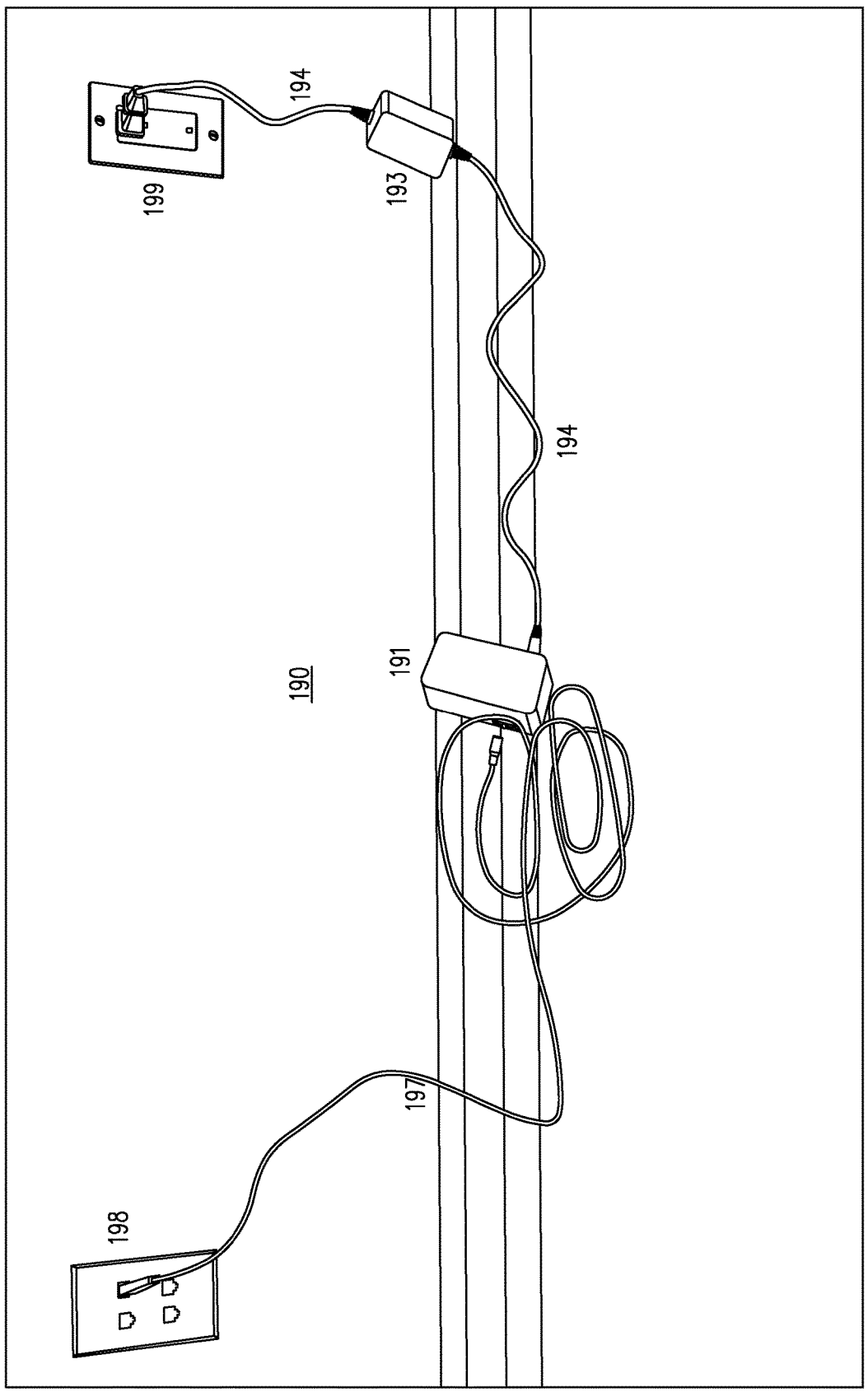
FIG. 1D shows a second picture of one example of the single prior art OD to TDD Converter/Transmitter of FIG. 1C typically used with the hypothetical data/Internet distribution system of FIG. 1B that would result if prior art optical systems were used to transmit OD within a structure from point to point.
Figure 7C:
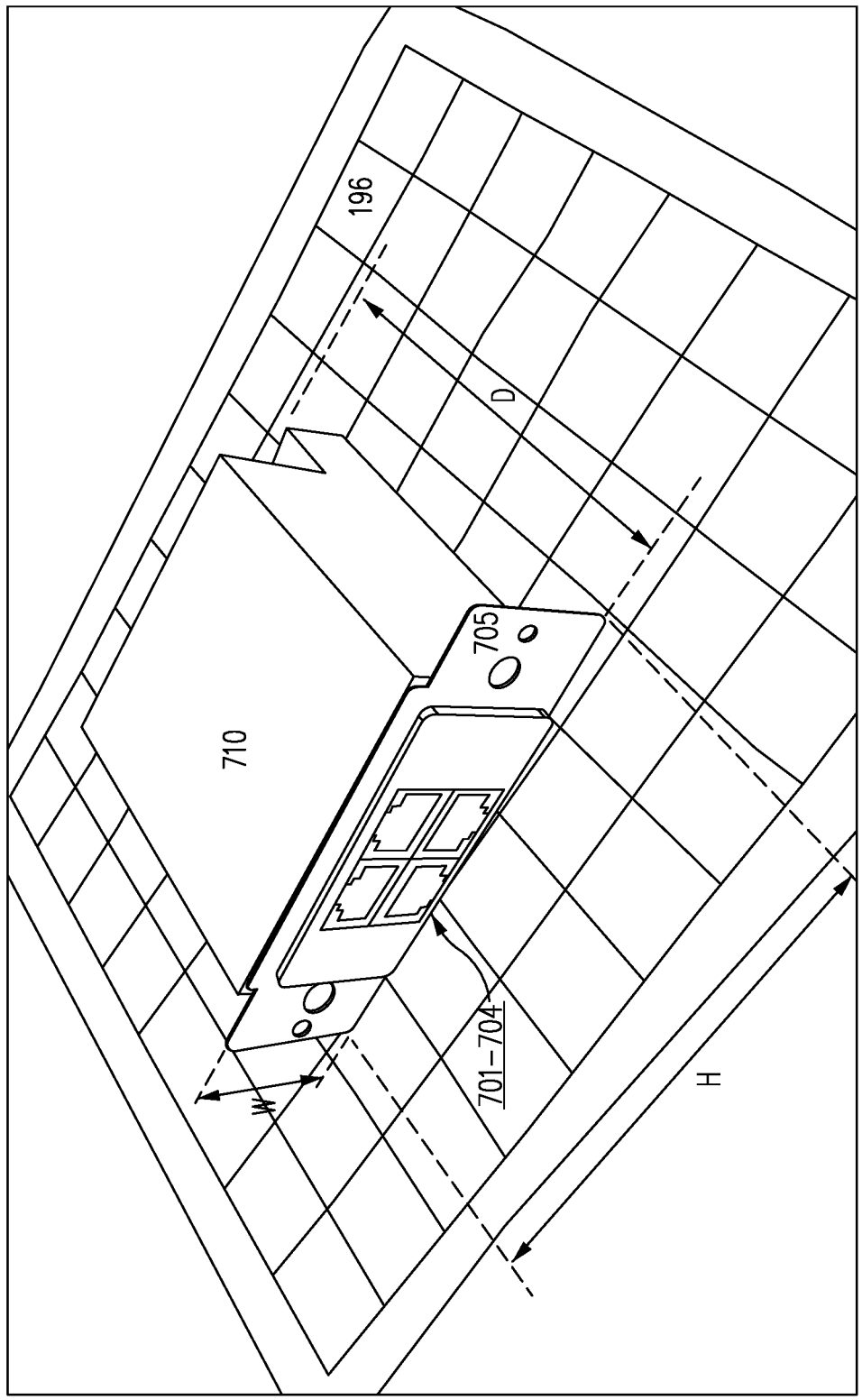
FIG. 7C shows a perspective view of one embodiment of a four standard RJ-45 port integrated converter/receiver in-wall mounted data access station of FIGS. 7A and 7B in more detail, in accordance with one embodiment.

FIG. 7C shows a perspective view of one embodiment of a four standard RJ-45 port integrated converter/receiver in-wall mounted data access station of FIGS. 7A and 7B in more detail, in accordance with one embodiment. The reader will note reference grid 196 for indicating the relative size of this specific illustrative embodiment of converter/receiver in-wall mounted data access station 700 is the same as that shown in FIG. 1C with OD to TDD Converter/Transmitter system 190. Also note that the size of this specific illustrative embodiment of converter/receiver in-wall mounted data access station 700 is less than half the size of the single OD to TDD Converter/Transmitter system 190, such as any of the eight OD to TDD converter/receivers 131 through 138.

Figure 7D:
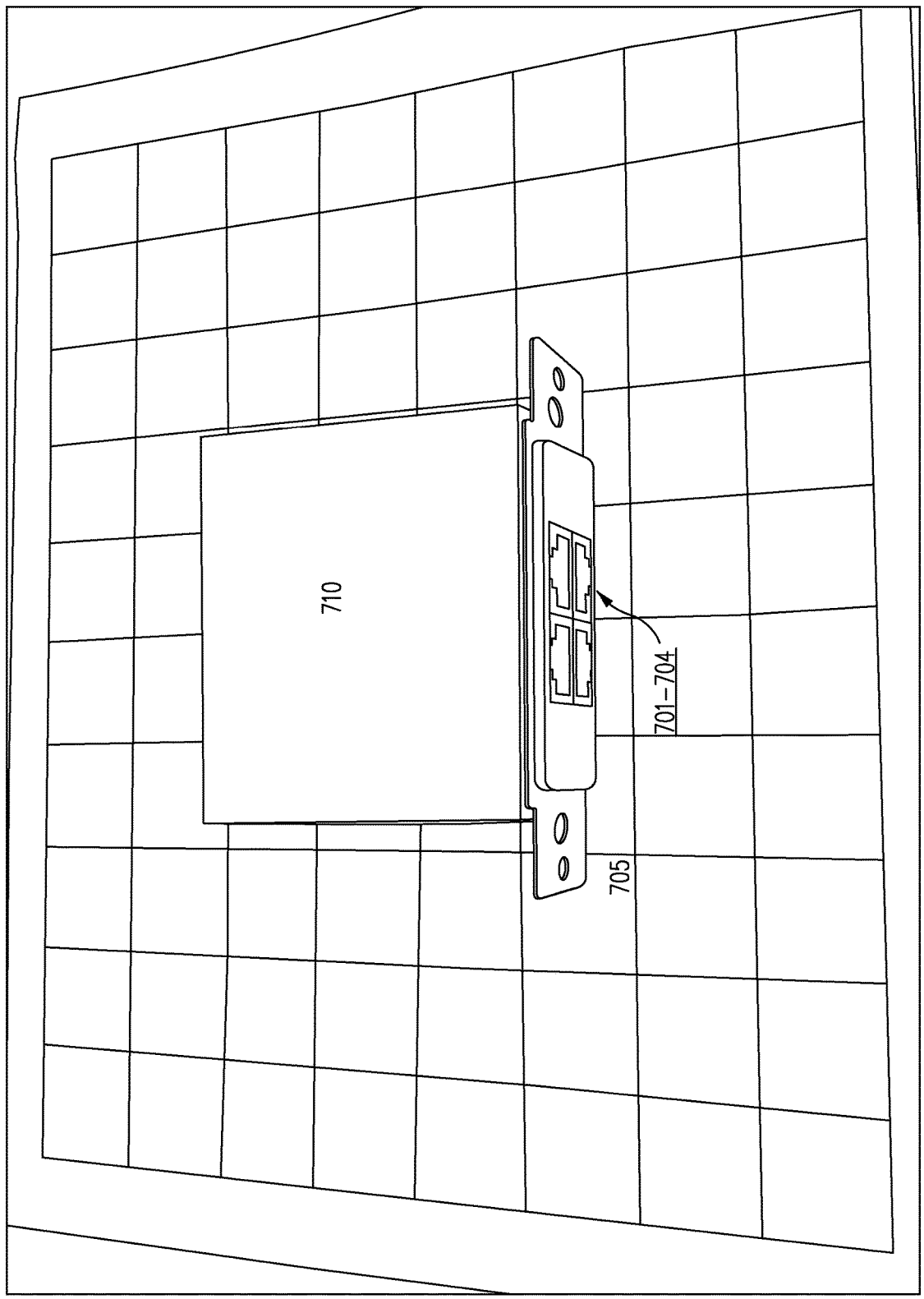
FIG. 7D shows a perspective view of one embodiment of a four standard RJ-45 port integrated converter/receiver in-wall mounted data access station of FIGS. 7A and 7B in more detail, in accordance with one embodiment.

FIG. 7D shows a perspective view of one embodiment of a four standard RJ-45 port integrated converter/receiver in-wall mounted data access station 700 of FIGS. 7A and 7B in more detail, in accordance with one embodiment.

Figure 7E:
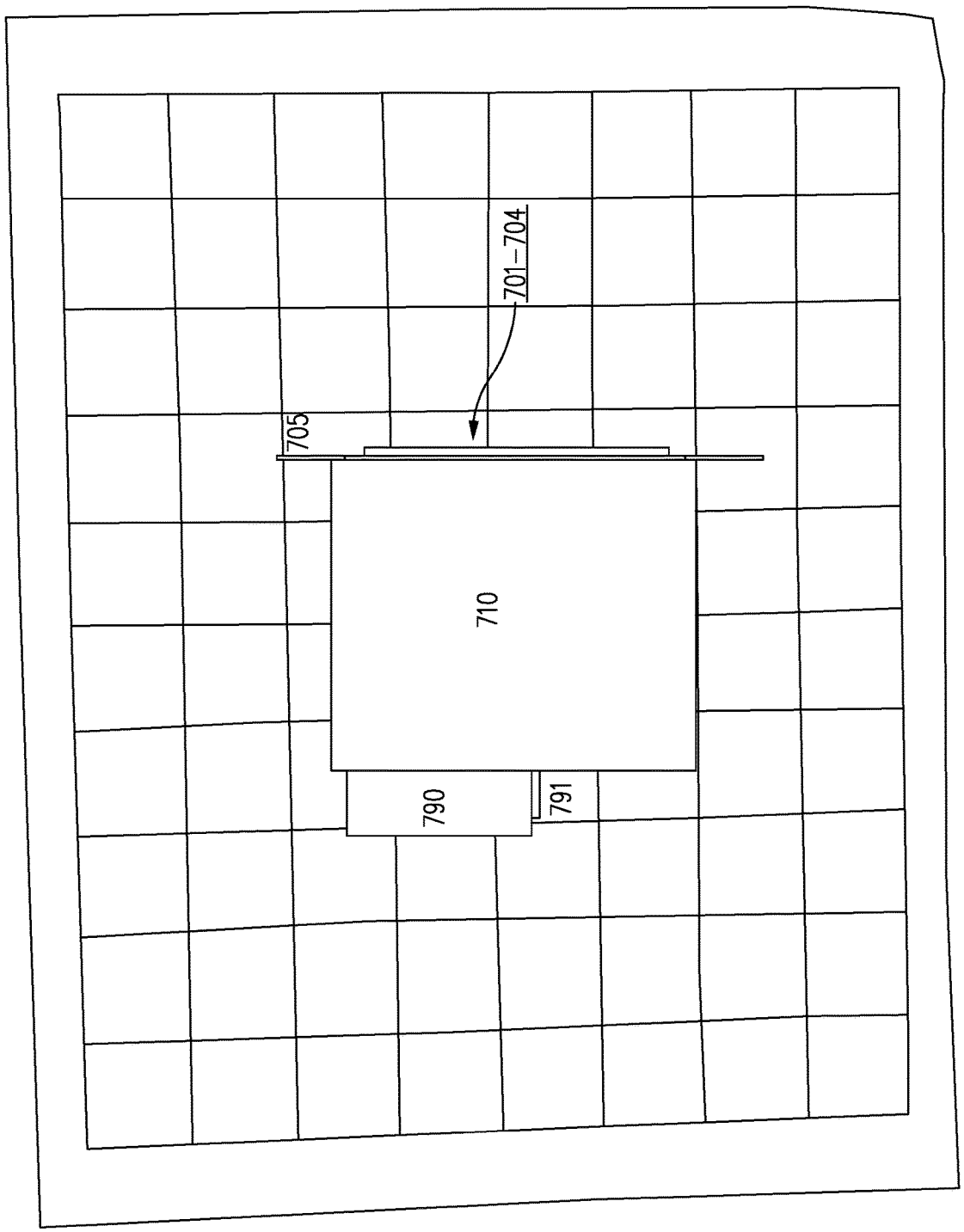
FIG. 7E shows a top view of one embodiment of a four standard RJ-45 port integrated converter/receiver in-wall mounted data access station of FIGS. 7A and 7B in more detail, in accordance with one embodiment.

FIG. 7E shows a top view of one embodiment of a four standard RJ-45 port integrated converter/receiver in-wall mounted data access station 700 of FIGS. 7A and 7B in more detail, in accordance with one embodiment.

Shown in FIG. 7E is converter step portion 790 for housing OD to TDD converter 810 discussed below with respect to FIG. 8 and OD input connector 791.

Figure 7F:
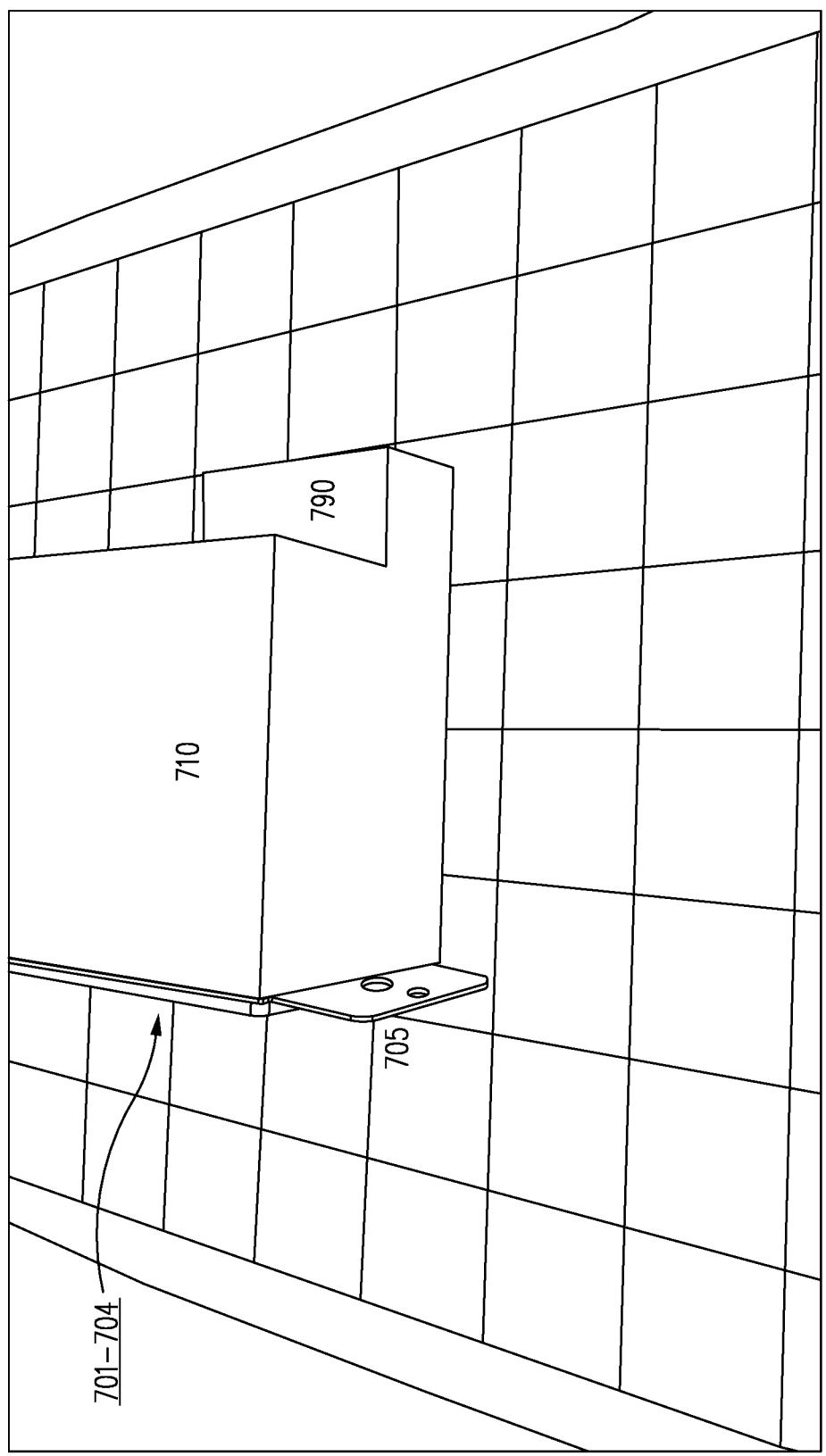
FIG. 7F shows a perspective view of one embodiment of a four standard RJ-45 port integrated converter/receiver in-wall mounted data access station of FIGS. 7A and 7B in more detail, in accordance with one embodiment.

FIG. 7F shows a perspective view of one embodiment of a four standard RJ-45 port integrated converter/receiver in-wall mounted data access station 700 of FIGS. 7A and 7B in more detail, in accordance with one embodiment.

Figure 7G:
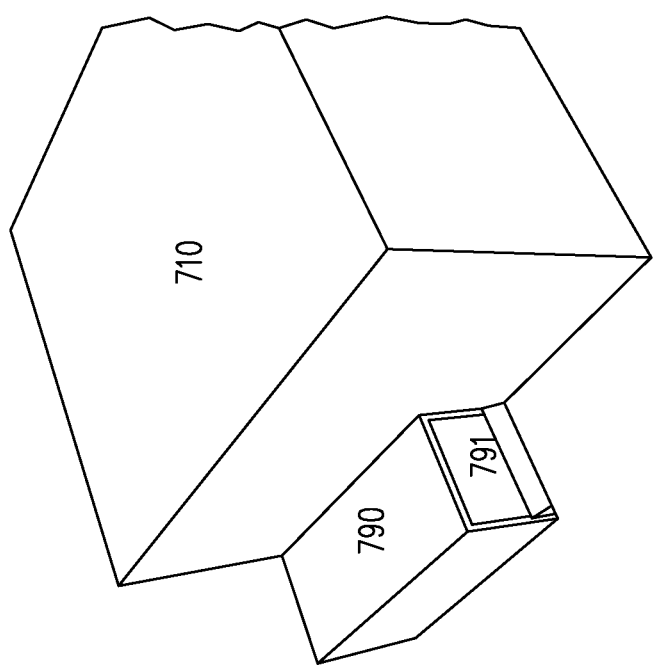
FIG. 7G shows a perspective view of one embodiment of a four standard RJ-45 port integrated converter/receiver in-wall mounted data access station of FIGS. 7A and 7B in more detail, in accordance with one embodiment.

FIG. 7G shows a perspective view of one embodiment of a four standard RJ-45 port integrated converter/receiver in-wall mounted data access station 700 of FIGS. 7A and 7B in more detail, in accordance with one embodiment.

Figure 7H:
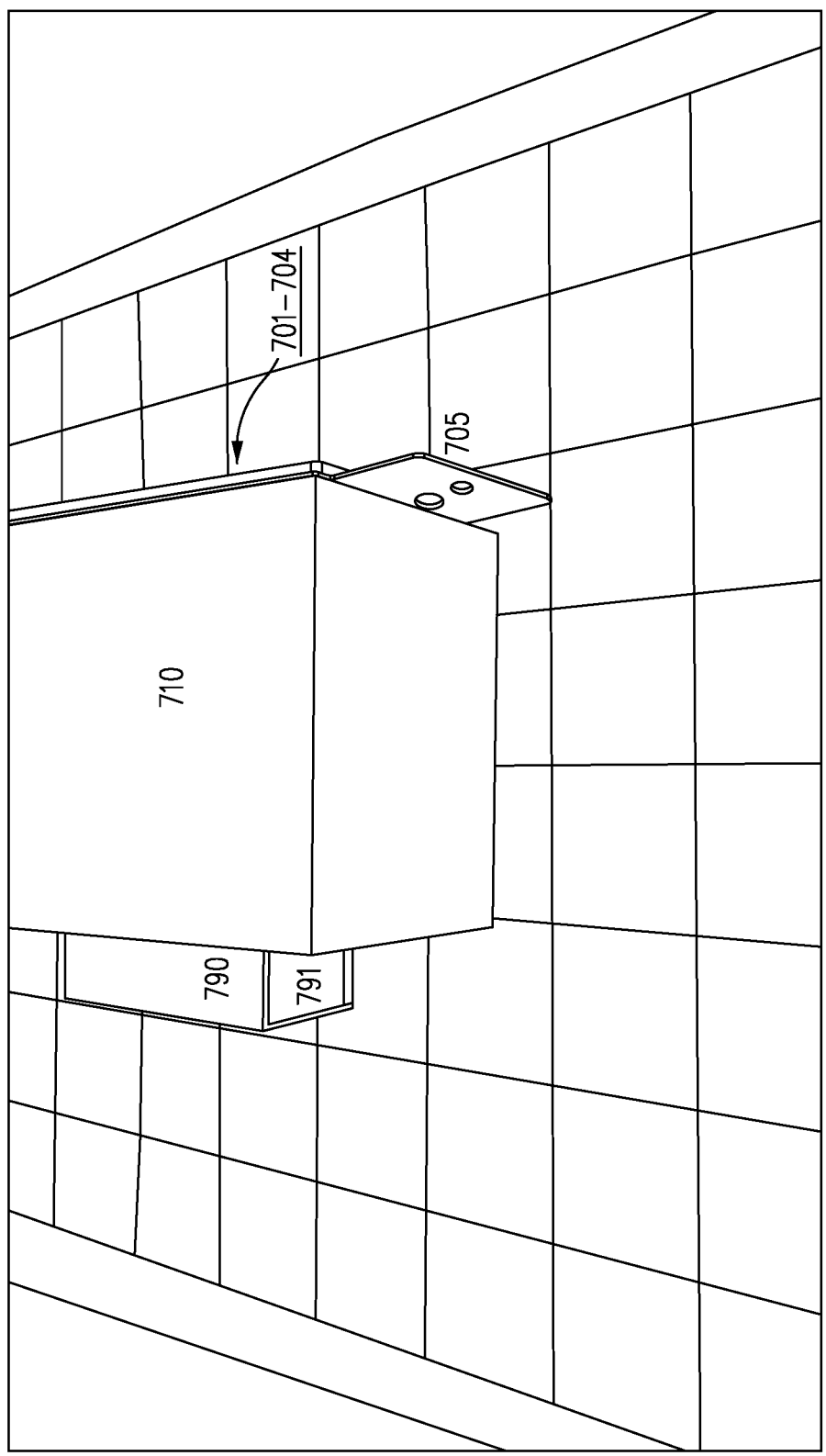
FIG. 7H shows a perspective view of one embodiment of a four standard RJ-45 port integrated converter/receiver in-wall mounted data access station of FIGS. 7A and 7B in more detail, in accordance with one embodiment.

FIG. 7H shows a perspective view of one embodiment of a four standard RJ-45 port integrated converter/receiver in-wall mounted data access station 700 of FIGS. 7A and 7B in more detail, in accordance with one embodiment.

Figure 8:
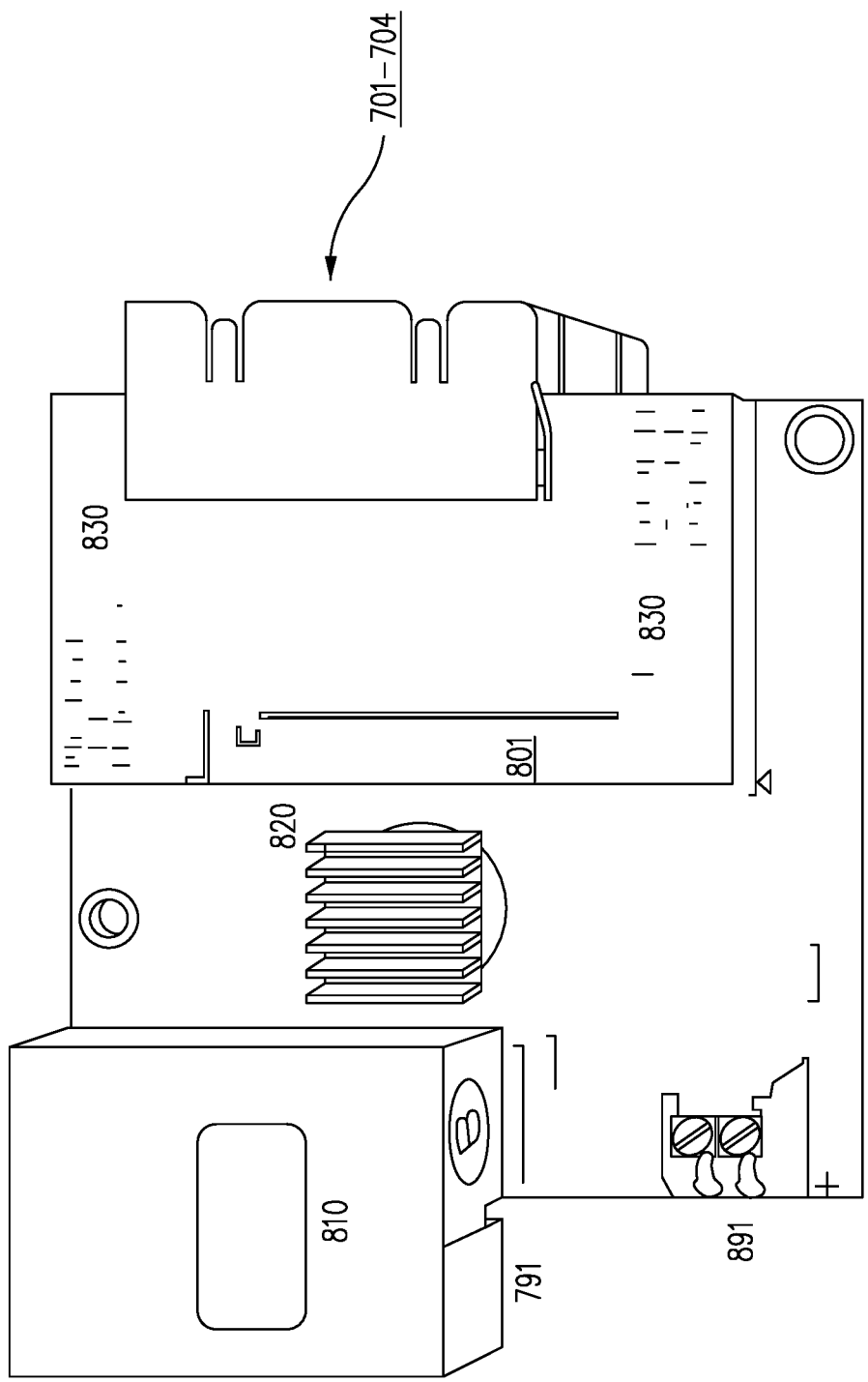
FIG. 8 shows the four standard RJ-45 port integrated converter/receiver in-wall mounted data access station of FIGS. 7A and 7B with housing cover removed to reveal some of the components of one embodiment of the four standard RJ-45 port integrated converter/receiver in-wall mounted data access station in accordance with one embodiment.

FIG. 8 shows the four standard RJ-45 port integrated converter/receiver in-wall mounted data access station 700 of FIGS. 7A and 7B with the converter/receiver 801 system housing 710 cover removed to reveal some of the components of one embodiment of the integrated converter/receiver 801 of four standard RJ-45 port integrated converter/receiver in-wall mounted data access station 700 in accordance with one embodiment.

As seen in FIG. 8, in one embodiment, integrated converter/receiver 801 includes: OD to TDD converter 810; processor and heat sink 820; integrated circuitry 830; and power connector 891. The general operation of OD to TDD converter/receivers is known in the art. Consequently, a more detailed description of the operation and components of OD to TDD converter/receivers is omitted here to avoid detracting from the invention.

FIGS. 9A through 9E show the four standard RJ-45 port integrated converter/receiver in-wall mounted data access station 700 of FIGS. 7A and 7B being installed in a hole/cavity 901 of a wall 900 such that integrated converter/receiver 801 and housing 710 are contained within hole/cavity 901 and wall 900 in accordance with one embodiment.

Figure 9A:
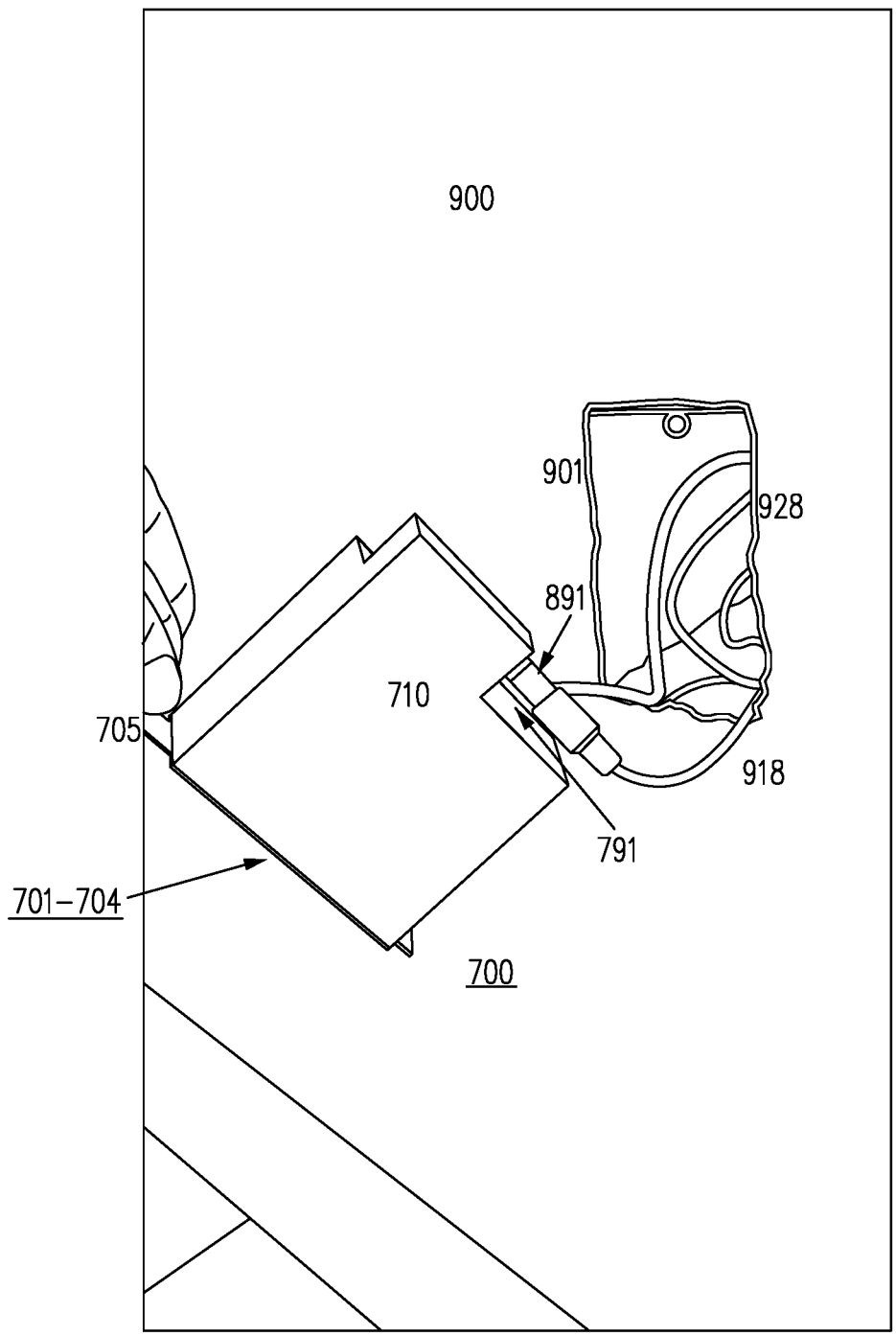
FIG. 9A shows the four standard RJ-45 port integrated converter/receiver in-wall mounted data access station of FIGS. 7A and 7B and a hole/cavity in a wall for installing the four standard RJ-45 port integrated converter/receiver in-wall mounted data access station in accordance with one embodiment.

In particular, FIG. 9A shows the four standard RJ-45 port integrated converter/receiver in-wall mounted data access station 700 of FIGS. 7A and 7B and hole/cavity 901 in a wall 900 for installing the four standard RJ-45 port integrated converter/receiver in-wall mounted data access station 700 such that integrated converter/receiver 801 and housing 710 are contained within hole/cavity 901 and wall 900 in accordance with one embodiment.

Figure 10:
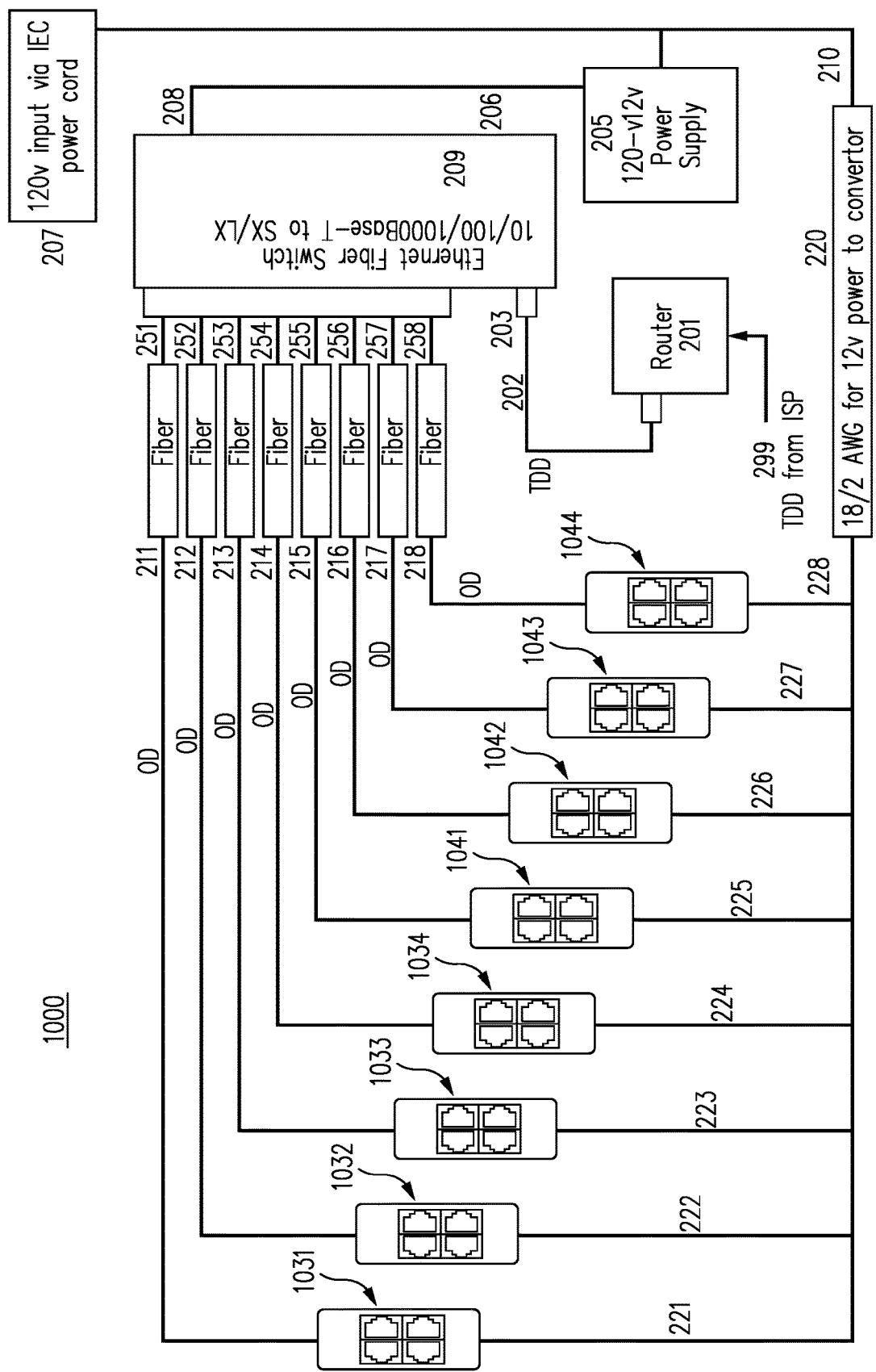
FIG. 10 shows one embodiment of a data network including a multi-port Ethernet fiber switch and integrated converter/receiver in-wall mounted data access stations of FIGS. 7A and 7B in accordance with one embodiment.

Also shown in FIG. 9A are OD data connector 791 with OD line 918, representative of any of OD lines 211-218 of FIG. 2 or 10, connected to connector 791. Also shown is power line 928, representative of any of the power lines 221-228 of FIG. 2 or 10, connected to power connector 891 (see FIG. 8).

Figure 9B:
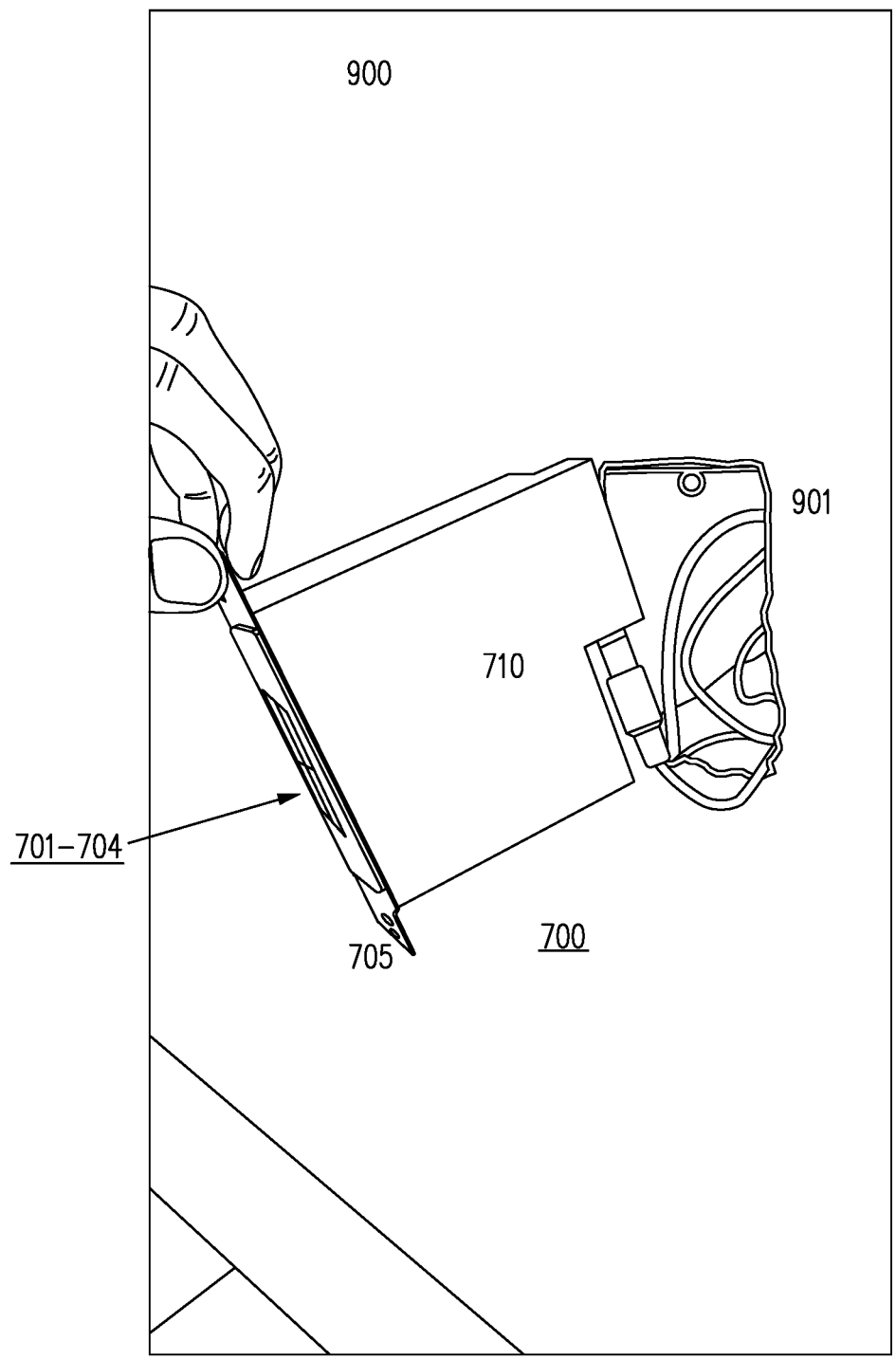
FIG. 9B shows the four standard RJ-45 port integrated converter/receiver in-wall mounted data access station of FIGS. 7A, 7B, and 9A being positioned in the hole/cavity in a wall for installing the four standard RJ-45 port integrated converter/receiver in-wall mounted data access station in accordance with one embodiment.

FIG. 9B shows the four standard RJ-45 port integrated converter/receiver in-wall mounted data access station 700 of FIGS. 7A, 7B, and 9A being positioned into the hole/cavity 901 of wall 900 for installing the four standard RJ-45 port integrated converter/receiver in-wall mounted data access station 700 such that integrated converter/receiver 801 and housing 710 are contained within hole/cavity 901 and wall 900 in accordance with one embodiment.

Figure 9C:
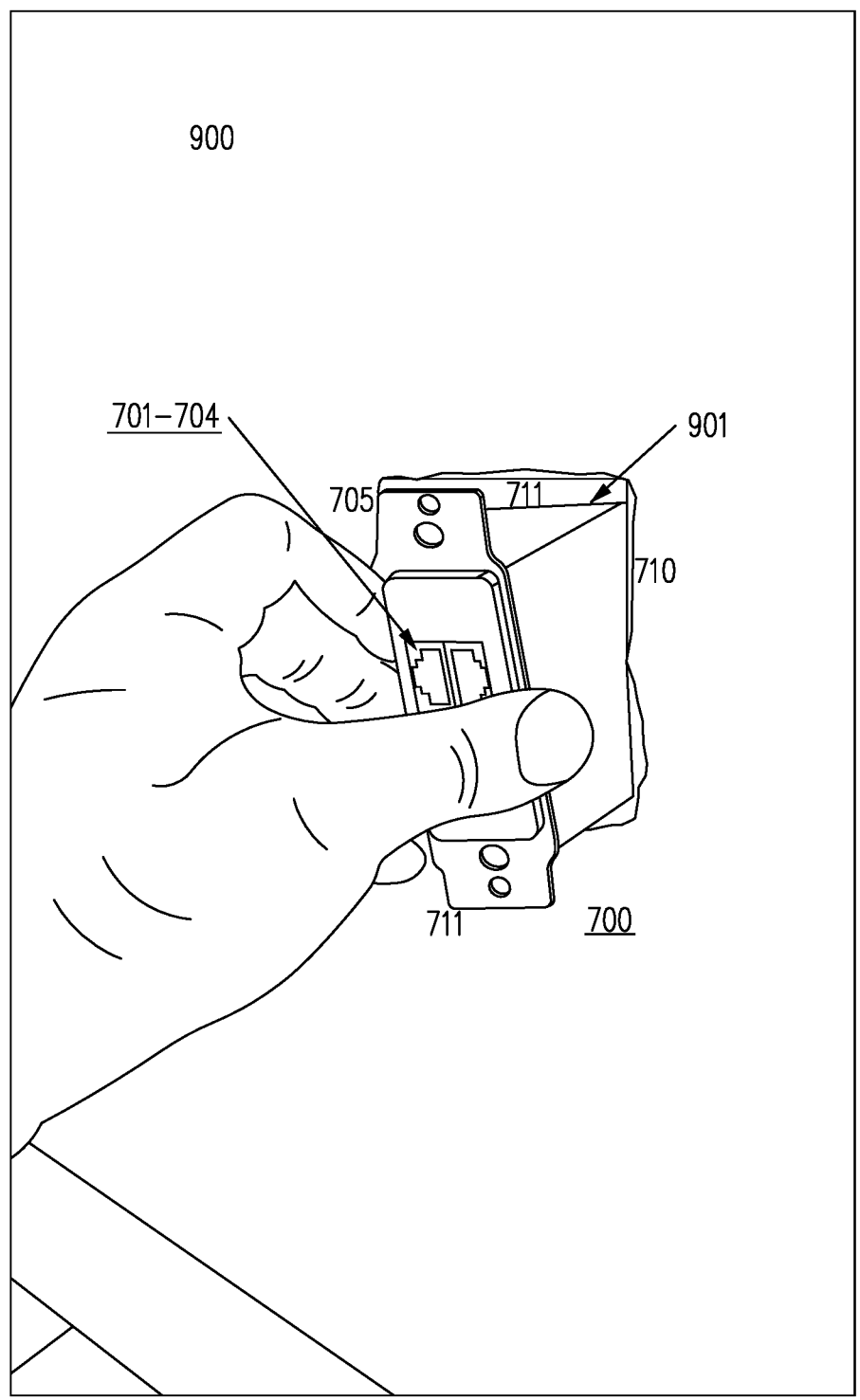
FIG. 9C shows the four standard RJ-45 port integrated converter/receiver in-wall mounted data access station of FIGS. 7A, 7B, and 9B being further positioned in the hole/cavity in a wall for installing the four standard RJ-45 port integrated converter/receiver in-wall mounted data access station in accordance with one embodiment.

FIG. 9C shows the four standard RJ-45 port integrated converter/receiver in-wall mounted data access station of FIGS. 7A, 7B, and 9B being positioned in the hole in a wall for installing the four standard RJ-45 port integrated converter/receiver in-wall mounted data access station such that integrated converter/receiver 801 and housing 710 are contained within hole/cavity 901 and wall 900 in accordance with one embodiment.

Figure 9D:
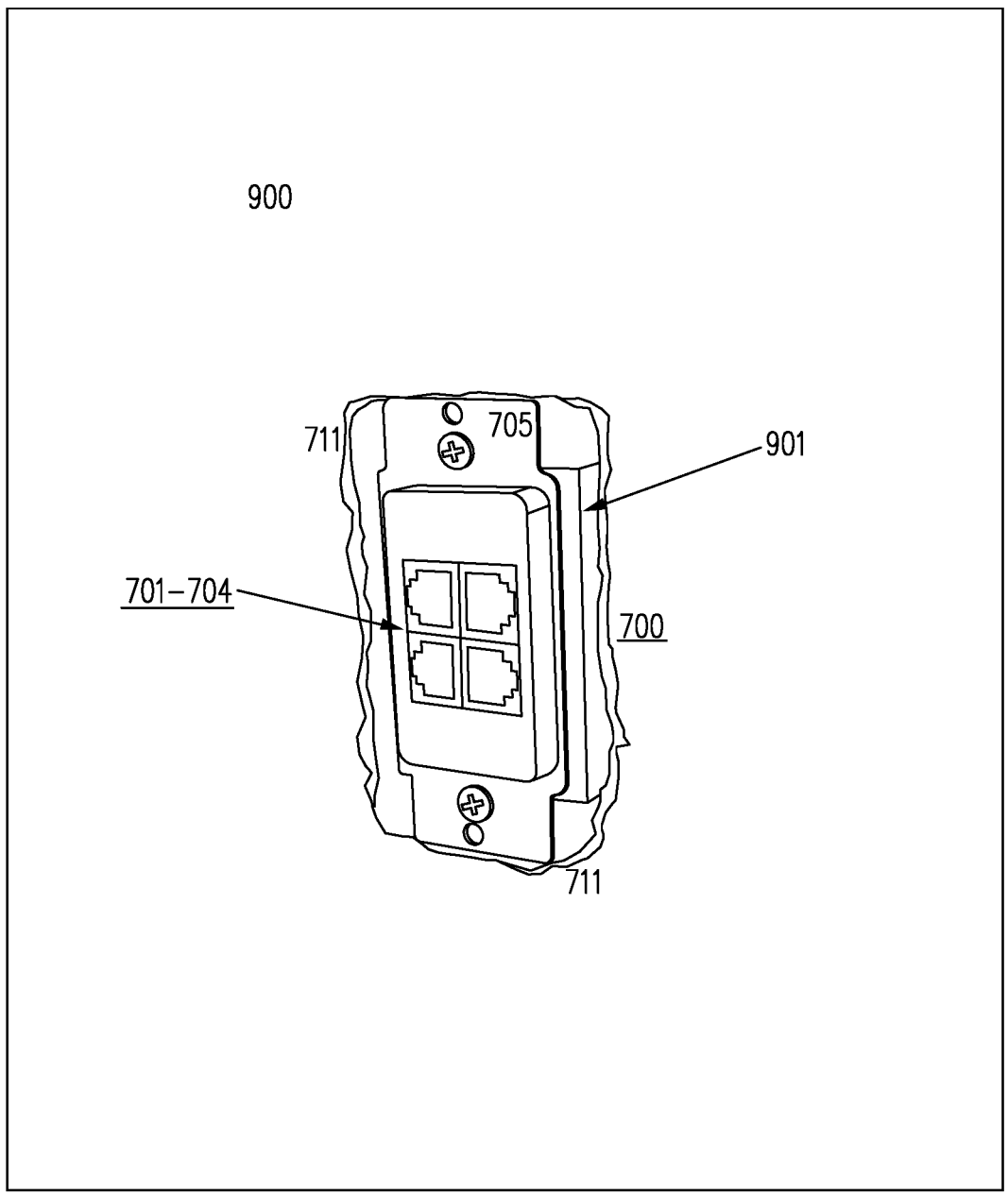
FIG. 9D shows the four standard RJ-45 port integrated converter/receiver in-wall mounted data access station of FIGS. 7A, 7B, and 9C positioned and installed in accordance with one embodiment.

FIG. 9D shows the four standard RJ-45 port integrated converter/receiver in-wall mounted data access station of FIGS. 7A, 7B, and 9C positioned and installed such that integrated converter/receiver 801 and housing 710 are contained within hole/cavity 901 and wall 900 in accordance with one embodiment with data ports 701-704 facing outward from the wall cavity 901 and wall 900.

Figure 9E:
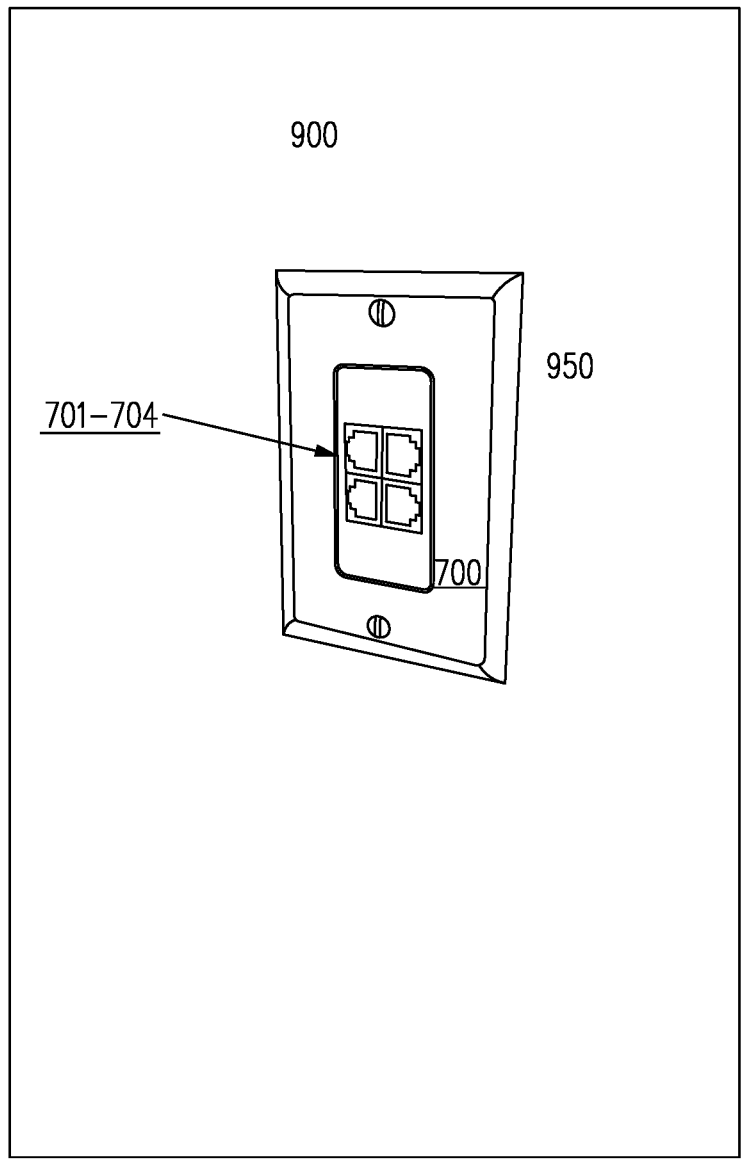
FIG. 9E shows the four standard RJ-45 port integrated converter/receiver in-wall mounted data access station of FIGS. 7A, 7B, and 9D positioned and installed along with a standard plate cover in accordance with one embodiment.

FIG. 9E shows the four standard RJ-45 port integrated converter/receiver in-wall mounted data access station of FIGS. 7A, 7B, and 9D positioned and installed such that integrated converter/receiver 801 and converter/receiver 801 system housing 710 are contained within hole/cavity 901 and wall 900 with data ports 701-704 facing outward from the wall cavity 901 and wall 900 in accordance with one embodiment. FIG. 9E also shows standard plate cover 950 installed in accordance with one embodiment.

FIG. 10 shows one embodiment of a data network 1000 including a multi-port Ethernet fiber switch and integrated converter/receiver in-wall mounted data access stations 1031, 1032, 1033, 1034, 1041, 1042, 1043, and 1044, each of which is similar to multi-port Ethernet fiber switch and integrated converter/receiver in-wall mounted data access station of FIGS. 7A and 7B in accordance with one embodiment.

Data network 1000 including a multi-port Ethernet fiber switch and integrated converter/receiver in-wall mounted data access stations is similar in structure and operation to data network 200 discussed above with respect to FIG. 2. In particular, referring to FIG. 10, in one embodiment, standard 120V high voltage power is provided from power source 207 to multi-port Ethernet fiber switch power supply 205 and converter/receiver in-wall mounted data access stations power converter 220. Multi-port Ethernet fiber switch power supply 205 then converts the 120V power to 12V power and provides the 12V power to multi-port Ethernet fiber switch 209 at connector 208.

Similarly, converter/receiver in-wall mounted data access stations power converter 220 converts the 120V power to 12V power and provides 12V power to each of disclosed integrated converter/receiver in-wall mounted data access stations 1031, 1032, 1033, 1034, 1041, 1042, 1043, and 1044, via low voltage power lines 221, 222, 223, 224, 225, 226, 227, and 228, respectively. The provided 12V low voltage power is used by integrated converter/receiver in-wall mounted data access stations 1031, 1032, 1033, 1034, 1041, 1042, 1043, and 1044 for powering integrated OD to TDD converters/receivers (not shown in FIG. 10, see FIGS. 6A through 6H and 7B through 8) of integrated converter/receiver in-wall mounted data access stations 1031, 1032, 1033, 1034, 1041, 1042, 1043, and 1044 and/or to power status lights, such as LEDs (not shown in FIG. 10, see FIGS. 6E and 6F) used for diagnostics and status monitoring of integrated converter/receiver in-wall mounted data access stations 1031, 1032, 1033, 1034, 1041, 1042, 1043, and 1044.

Those of skill in the art will recognize that the placement of power supply 205 and/or converter/receiver in-wall mounted data access stations power converter 220 outside of multi-port Ethernet fiber switch 209 in the specific illustrative example of one embodiment in FIG. 10 is indeed made for illustrative purposes only. In other embodiments, multi-port Ethernet fiber switch power supply 205 and/or converter/receiver in-wall mounted data access stations power converter 220 could be part of, or included within, multi-port Ethernet fiber switch 209 and/or any of integrated converter/receiver in-wall mounted data access stations 1031, 1032, 1033, 1034, 1041, 1042, 1043, and 1044.

Returning to FIG. 10, as discussed above, according to embodiments disclosed herein, TDD is provided to a router 201 from an ISP or intermediate station at 299, as discussed in more detail above. Router 201 then provides the TDD to multi-port Ethernet fiber switch 209 at Ethernet connector 203 via single Ethernet line 202. As seen in FIG. 10, multi-port Ethernet fiber switch 209 includes multi-port Ethernet fiber switch ports, in this specific example eight multi-port Ethernet fiber switch ports 251 through 258.

Returning to FIG. 10, the OD converted from TDD by multi-port Ethernet fiber switch 209 is then transmitted to multiple integrated converter/receiver in-wall mounted data access stations 1031, 1032, 1033, 1034, 1041, 1042, 1043, 1044 through the multiple optical lines 211 through 218.

In one embodiment, one or more of optical lines 211 through 218 are single mode fiber lines. In some embodiments, one or more of optical lines 211 through 218 are multi-mode fiber lines.

Those of skill in the art will recognize that the purely illustrative choice of a multi-port Ethernet fiber switch with eight multi-port Ethernet fiber switch ports 251 through 258 and eight optical lines 211 through 218 was indeed made for illustrative purposes only and that any number of multi-port Ethernet fiber switch ports and/or optical lines can be accommodated by various embodiments of the disclosed multi-port Ethernet fiber switch. In addition, in some cases the number of multi-port Ethernet fiber switch ports provided does not correspond to the number of optical lines used to transmit OD. That is to say, in some cases, not all multi-port Ethernet fiber switch ports are used in a given implementation so that the number of optical lines is less than the number of multi-port Ethernet fiber switch ports provided. This provides for future expansion and growth.

In addition, numerous types and configurations of multi-port Ethernet fiber switches are known and can be used with the disclosed methods and systems. Consequently, a more detailed discussion of the operation of a specific example of any multi-port Ethernet fiber switch is omitted here to avoid detracting from the invention.

As discussed in more detail below, in one embodiment, each integrated converter/receiver in-wall mounted data access station 1031, 1032, 1033, 1034, 1041, 1042, 1043, 1044 includes an integrated OD to TDD converter/receiver (not shown in FIG. 10, see FIGS. 6A through 6H and 7B through 8) that, in one embodiment, is situated in a cavity in the wall in which the integrated converter/receiver in-wall mounted data access stations 1031, 1032, 1033, 1034, 1041, 1042, 1043, 1044 reside (see FIGS. 9A through 9D). In addition, in one embodiment, each integrated converter/receiver in-wall mounted data access station 1031, 1032, 1033, 1034, 1041, 1042, 1043, 1044 includes one or more data ports, such as standard RJ-45 ports.

As also discussed in more detail below, in some embodiments, the integrated converter/receiver in-wall mounted data access stations, such as integrated converter/receiver in-wall mounted data access stations 1031, 1032, 1033, 1034, 1041, 1042, 1043, 1044 can include two (or more) standard RJ-45 ports. In some embodiments, the integrated converter/receiver in-wall mounted data access stations, such as integrated converter/receiver in-wall mounted data access stations 1031, 1032, 1033, 1034, 1041, 1042, 1043, 1044 include four (or more) standard RJ-45 ports.

Those of skill in the art will recognize that the choice of eight integrated converter/receiver in-wall mounted data access stations 1031, 1032, 1033, 1034, 1041, 1042, 1043, 1044 that include four standard RJ-45 ports is made for illustrative purposes only. In various embodiments, any number of integrated converter/receiver in-wall mounted data access with one (or more) standard RJ-45 ports could be used. In addition, the choice of four standard RJ-45 ports for integrated converter/receiver in-wall mounted data access stations 1031, 1032, 1033, 1034, 1041, 1042, 1043, 1044 was also made for illustrative purposes only and that in various embodiments any number of RJ-45 ports can be provided at each integrated converter/receiver in-wall mounted data access station.

Using the one example of data network including a multi-port Ethernet fiber switch and integrated converter/receiver in-wall mounted data access stations 1000 of FIG. 10, a single multi-port Ethernet fiber switch 209 can convert TDD to OD and provide the OD on eight multi-port Ethernet fiber switch ports 251 through 258 for transmission to multiple integrated converter/receiver in-wall mounted data access stations 1031, 1032, 1033, 1034, 1041, 1042, 1043, 1044. In addition, each integrated converter/receiver in-wall mounted data access station 1031, 1032, 1033, 1034, 1041, 1042, 1043, 1044 can convert the OD to TDD and provide TDD on multiple data ports, such as standard RJ-45 ports, at the point of need, anywhere in the structure, using OD to TDD converter/receivers that can be neatly concealed in a wall (see FIGS. 9A through 9E). In this particular illustrative example, four standard RJ-45 ports are provided by each of integrated converter/receiver in-wall mounted data access stations 1031, 1032, 1033, 1034, 1041, 1042, 1043, 1044 for a total of, in this very specific illustrative example of FIG. 10, thirty-two standard RJ-45 capable of supporting 32 separate Internets devices at eight separate locations.

Consequently, in this specific example, the equipment required to provide Internet to twenty-four Internet devices would include one router 201, one disclosed multi-port Ethernet fiber switch 209, eight optical lines 211 through 218, and eight integrated converter/receiver in-wall mounted data access stations 1031 through 1034 and 1041 through 1044. In addition, since optical lines 211 through 218 are used, the OD can be provided to eight separate locations as far away from the disclosed multi-port Ethernet fiber switch 209 as desired and the disclosed integrated converter/receiver in-wall mounted data access stations 1031 through 1034 and 1041 through 1044, including the OD to TDD converters/receivers, can be hidden in the wall and out of the way (see FIGS. 9A through 9E).

In contrast, as noted, using traditional Ethernet TDD systems, connecting thirty-two Internet devices would require a router and thirty-two separate TDD Ethernet lines. In addition, the separate TDD Ethernet lines could only be used for distances of one hundred meters or less. Likewise, if traditional optical systems were used to connect the same thirty-two Internet devices, this would require a router, thirty-two TDD to OD converters/transmitters, thirty-two optical lines, and thirty-two OD to TDD converters/receivers. In addition, desk or wall space would be required for sixty-four devices, each of the thirty-two TDD to OD converters/transmitters and each of the thirty-two OD to TDD converters/receivers.

Figure 11:
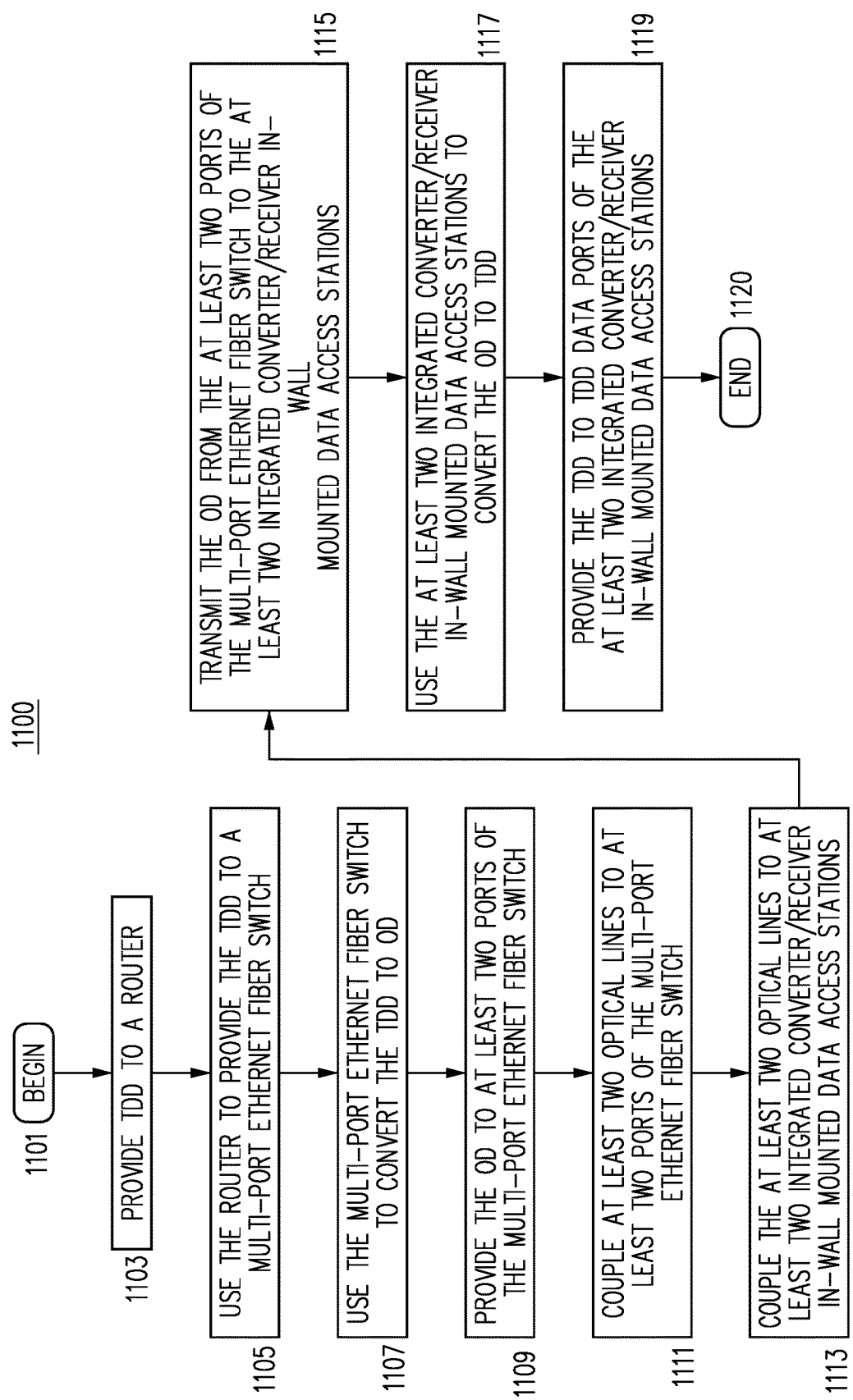
FIG. 11 is a simplified flow chart showing the major operations making up a method for providing a data network including a multi-port Ethernet fiber switch and integrated converter/receiver in-wall mounted data access stations in accordance with one embodiment.

FIG. 11 is a simplified flow chart showing the major operations making up a method 1100 for providing a data network including a multi-port Ethernet fiber switch and integrated converter/receiver in-wall mounted data access stations in accordance with one embodiment.

As seen in FIG. 11. In one embodiment, method 1100 begins at BEGIN OPERATION 1101.

In one embodiment, at PROVIDE TDD TO A ROUTER OPERATION 1103, TDD is provided to a router.

For a more detailed discussion of the performance of PROVIDE TDD TO A ROUTER OPERATION 1103 in some embodiments, the reader is referred to the discussion above of FIGS. 2, 3D, 3E, and 10.

Referring back to FIG. 11, in one embodiment, at USE THE ROUTER TO PROVIDE THE TDD TO A MULTI-PORT ETHERNET FIBER SWITCH OPERATION 1105, the router of 1103 is used to provide the TDD to a multi-port Ethernet fiber switch, the multi-port Ethernet fiber switch having two or more multi-port Ethernet fiber switch ports.

For a more detailed discussion of the performance of USE THE ROUTER TO PROVIDE THE TDD TO A MULTI-PORT ETHERNET FIBER SWITCH OPERATION 1105 in some embodiments, the reader is referred to the discussion above of FIGS. 2, 3A-3E, and 10.

Referring back to FIG. 11, in one embodiment, at USE THE MULTI-PORT ETHERNET FIBER SWITCH TO CONVERT THE TDD TO OD OPERATION 1107 the TDD IS CONVERTED to Optical Data (OD) using the multi-port Ethernet fiber switch of 1105.

For a more detailed discussion of the performance of USE THE MULTI-PORT ETHERNET FIBER SWITCH TO CONVERT THE TDD TO OD OPERATION 1107 in some embodiments, the reader is referred to the discussion above of FIGS. 2, 3A-3E, and 10.

Referring back to FIG. 11, in one embodiment, at PROVIDE THE OD TO AT LEAST TWO PORTS OF THE MULTI-PORT ETHERNET FIBER SWITCH OPERATION 1109, the OD from the multi-port Ethernet fiber switch of 1105 is provided to at least two of the multi-port Ethernet fiber switch ports of the multi-port Ethernet fiber switch of 1105.

For a more detailed discussion of the performance of PROVIDE THE OD TO AT LEAST TWO PORTS OF THE MULTI-PORT ETHERNET FIBER SWITCH OPERATION 1109 in some embodiments, the reader is referred to the discussion above of FIGS. 2, 3A-3E, and 10.

Referring back to FIG. 11, in one embodiment, at COUPLE AT LEAST TWO OPTICAL LINES TO AT LEAST TWO PORTS OF THE MULTI-PORT ETHERNET FIBER SWITCH OPERATION 1111 at least two optical lines are coupled to the at least two of the multi-port Ethernet fiber switch ports of 1105 that are provided the OD of 1109.

For a more detailed discussion of the performance of COUPLE AT LEAST TWO OPTICAL LINES TO AT LEAST TWO PORTS OF THE MULTI-PORT ETHERNET FIBER SWITCH OPERATION 1111 in some embodiments, the reader is referred to the discussion above of FIGS. 2, 3A-3E, and 10.

Referring back to FIG. 11, in one embodiment, at COUPLE THE AT LEAST TWO OPTICAL LINES TO AT LEAST TWO INTEGRATED CONVERTER/RECEIVER IN-WALL MOUNTED DATA ACCESS STATIONS OPERATION 1113 the at least two optical lines coupled to the at least two of the multi-port Ethernet fiber switch ports that are provided the OD of 1111 are also coupled to at least two integrated converter/receiver in-wall mounted data access stations, each of the at least two integrated converter/receiver in-wall mounted data access stations including an integrated OD to TDD converter/receiver and at least one TDD data port.

For a more detailed discussion of the performance of COUPLE THE AT LEAST TWO OPTICAL LINES TO AT LEAST TWO INTEGRATED CONVERTER/RECEIVER IN-WALL MOUNTED DATA ACCESS STATIONS OPERATION 1113 in some embodiments, the reader is referred to the discussion above of FIGS. 2, 3A-3E, 4, 5, 6A-6H, 7A-7H, 8, 9A-9E, and 10.

Referring back to FIG. 11, in one embodiment, at TRANSMIT THE OD FROM THE AT LEAST TWO PORTS OF THE MULTI-PORT ETHERNET FIBER SWITCH TO THE AT LEAST TWO INTEGRATED CONVERTER/RECEIVER IN-WALL MOUNTED DATA ACCESS STATIONS OPERATION 1115 the at least two optical lines coupled to the at least two of the multi-port Ethernet fiber switch ports and to the at least two integrated converter/receiver in-wall mounted data access stations of 1113 are used to transmit the OD from the at least two multi-port Ethernet fiber switch ports to the at least two integrated converter/receiver in-wall mounted data access stations.

For a more detailed discussion of the performance of TRANSMIT THE OD FROM THE AT LEAST TWO PORTS OF THE MULTI-PORT ETHERNET FIBER SWITCH TO THE AT LEAST TWO INTEGRATED CONVERTER/RECEIVER IN-WALL MOUNTED DATA ACCESS STATIONS OPERATION 1115 in some embodiments, the reader is referred to the discussion above of FIGS. 2, 3A-3E, 4, 5, 6A-6H, 7A-7H, 8, 9A-9E, and 10.

Referring back to FIG. 11, in one embodiment, at USE THE AT LEAST TWO INTEGRATED CONVERTER/RECEIVER IN-WALL MOUNTED DATA ACCESS STATIONS TO CONVERT THE OD TO TDD OPERATION 1117, at each of the at least two integrated converter/receiver in-wall mounted data access stations, the OD transmitted to the at least two integrated converter/receiver in-wall mounted data access stations using the at least two optical lines connected to the at least two multi-port Ethernet fiber switch ports of 1115 is converted from OD to TDD using the integrated OD to TDD converter/receivers of the at least two integrated converter/receiver in-wall mounted data access stations.

For a more detailed discussion of the performance of USE THE AT LEAST TWO INTEGRATED CONVERTER/RECEIVER IN-WALL MOUNTED DATA ACCESS STATIONS TO CONVERT THE OD TO TDD OPERATION 1117, in some embodiments, the reader is referred to the discussion above of FIGS. 2, 3A-3E, 4, 5, 6A-6H, 7A-7H, 8, 9A-9E, and 10.

Referring back to FIG. 11, in one embodiment, at PROVIDE THE TDD TO TDD DATA PORTS OF THE AT LEAST TWO INTEGRATED CONVERTER/RECEIVER IN-WALL MOUNTED DATA ACCESS STATIONS OPERATION 1119 at each of the at least two integrated converter/receiver in-wall mounted data access stations, the TDD of 1117 is provided to each of the at least one TDD data port of each of the at least two integrated converter/receiver in-wall mounted data access stations.

For a more detailed discussion of the performance of PROVIDE THE TDD TO TDD DATA PORTS OF THE AT LEAST TWO INTEGRATED CONVERTER/RECEIVER IN-WALL MOUNTED DATA ACCESS STATIONS OPERATION 1119 in some embodiments, the reader is referred to the discussion above of FIGS. 2, 3A-3E, 4, 5, 6A-6H, 7A-7H, 8, 9A-9E, and 10.

Referring back to FIG. 11, in one embodiment, at END OPERATION 1120 method 1100 is complete.

The use of the disclosed methods and systems significantly reduces the number of TDD to OD conversion/transmission devices required and integrates the OD to TDD conversion/receiver devices into multiple standard RJ-45 port integrated converter/receiver in-wall mounted data access stations so that the OD to TDD conversion/receiver devices can be positioned within a wall, like a standard electrical outlet box, out of the way of desktops and working space.

In addition, since, using the disclosed methods and systems, optical lines are used inside the structure, the data can be provided as far away from the disclosed multi-port Ethernet fiber switch as desired and the disclosed integrated converter/receiver in-wall mounted data access stations, including the OD to TDD converters/receivers, can be hidden in the wall and out of the way.

In addition, since the disclosed method and system uses optical lines and OD, the optical lines and OD are not subject to electrical/magnetic interference. Consequently, using the disclosed methods and systems, the optical lines can run as close to high voltage power lines as desired and there is no need for the standard 14-inch separation required in Ethernet line data connections. Indeed, using the disclosed methods and systems, the optical lines can be bundled with the high voltage power lines and actually use the same conduits, wholes, spaces, and runs as the high voltage power lines. This makes the use of the disclosed methods and systems much simpler, more efficient, and more effective than the use of traditional Ethernet lines.

In addition, the diameter of an optical line, such as a standard fiber optic line is 0.25 to 0.5 mm. Thus, the diameter of an optical line is less than $\frac{1}{20}$ to $\frac{1}{10}$ the 5.2 mm diameter of a typical Ethernet line. Consequently, by using optical lines and OD, the disclosed methods and systems allow for a highly significant reduction in the size of any holes or conduits used when compared with traditional Ethernet systems.

As shown above, the disclosed methods and systems provide a technical solution to the long-standing technical problem of providing effective and efficient distribution of OD throughout a structure and effective and efficient conversion of TDD to OD and then OD to TDD at the point of need, i.e., at the Internet device locations throughout the structure.

In one embodiment, a disclosed method for providing a data network includes: providing Traditional Digital Data (TDD) to a router; using the router to provide the TDD to a multi-port Ethernet fiber switch, the multi-port Ethernet fiber switch having two or more multi-port Ethernet fiber switch ports; converting the TDD to Optical Data (OD) using the multi-port Ethernet fiber switch; providing the OD to at least two of the multi-port Ethernet fiber switch ports; coupling at least two optical lines to the at least two of the multi-port Ethernet fiber switch ports that are provided the OD; coupling the at least two optical lines to at least two integrated converter/receiver in-wall mounted data access stations, each of the at least two integrated converter/receiver in-wall mounted data access stations including an integrated OD to TDD converter/receiver and at least one TDD data port; transmitting the OD to the at least two integrated converter/receiver in-wall mounted data access stations using the at least two optical lines connected to the at least two multi-port Ethernet fiber switch ports; at each of the at least two integrated converter/receiver in-wall mounted data access stations converting the OD to TDD using the integrated OD to TDD converter/receiver; and at each of the at least two integrated converter/receiver in-wall mounted data access stations providing the TDD to each of the at least one TDD data port.

In one embodiment of the disclosed method, at least one of the two optical lines is a single-mode optical fiber line. In one embodiment at least one of the two optical lines is a multi-mode optical fiber line.

In one embodiment of the disclosed method, the at least one of the at least two integrated converter/receiver in-wall mounted data access stations is positioned in a wall cavity such that the integrated OD to TDD converter/receiver is positioned within the wall cavity and the at least one TDD data port faces outward from the wall cavity and wall.

In one embodiment of the disclosed method at least one TDD data port of at least one of the at least two integrated converter/receiver in-wall mounted data access stations is a standard RJ-45 data port.

In one embodiment of the disclosed method at least one of the at least two integrated converter/receiver in-wall mounted data access stations is dimensioned such that the at least one of the at least two integrated converter/receiver in-wall mounted data access stations fits within a standard USA single gang electrical box.

In one embodiment of the disclosed method, at least one of the at least two integrated converter/receiver in-wall mounted data access stations has a height dimension of approximately 70 mm, a width dimension of approximately 52 mm, and a depth dimension of approximately 60 mm.

In one embodiment of the disclosed method at least one of the at least two integrated converter/receiver in-wall mounted data access stations has a removable faceplate.

In one embodiment, a disclosed system for providing a data network includes: Traditional Digital Data (TDD); a router, the router receiving the TDD; a multi-port Ethernet fiber switch, the multi-port Ethernet fiber switch having a TDD to OD converter/transmitter for converting TDD to OD, the multi-port Ethernet fiber switch having two or more multi-port Ethernet fiber switch ports, wherein the multi-port Ethernet fiber switch converts the TDD to OD and provides the converted OD at each of the two or more multi-port Ethernet fiber switch ports; at least two integrated converter/receiver in-wall mounted data access stations, each integrated converter/receiver in-wall mounted data access station including an integrated OD to TDD converter/receiver and at least one data port; at least two optical lines coupled to at least two of the multi-port Ethernet fiber switch ports, wherein the at least two optical lines provide the OD from the multi-port Ethernet fiber switch to the integrated OD to TDD converter/receivers of the at least two integrated converter/receiver in-wall mounted data access stations further wherein the OD provided at the OD to TDD converter/receivers of the at least two integrated converter/receiver in-wall mounted data access stations is converted back to TDD by the OD to TDD converter/receivers of the at least two integrated converter/receiver in-wall mounted data access stations, further wherein at each of the at least two integrated converter/receiver in-wall mounted data access stations the TDD converted by the OD to TDD converter/receivers of the at least two integrated converter/receiver in-wall mounted data access stations is provided to each of the at least one data ports of the at least two integrated converter/receiver in-wall mounted data access stations.

In one embodiment of the disclosed system, at least one of the two optical lines is a single-mode optical fiber line.

In one embodiment of the disclosed system, at least one of the two optical lines is a multi-mode optical fiber line.

In one embodiment of the disclosed system, at least two integrated converter/receiver in-wall mounted data access stations is positioned in a wall cavity such that the integrated OD to TDD converter/receiver is positioned within the wall cavity and the at least one TDD data port faces outward from the wall cavity and wall.

In one embodiment of the disclosed system, at least one TDD data port of at least one of the at least two integrated converter/receiver in-wall mounted data access stations is a standard RJ-45 data port.

In one embodiment of the disclosed system, at least one of the at least two integrated converter/receiver in-wall mounted data access stations is dimensioned such that the at least one of the at least two integrated converter/receiver in-wall mounted data access stations fits within a standard USA single gang electrical box.

In one embodiment of the disclosed system, at least one of the at least two integrated converter/receiver in-wall mounted data access stations has a height dimension of approximately 70 mm, a width dimension of approximately 52 mm, and a depth dimension of approximately 60 mm.

In one embodiment of the disclosed system, at least one of the at least two integrated converter/receiver in-wall mounted data access stations has a removable faceplate In one embodiment, a disclosed integrated converter/receiver in-wall mounted data access station includes an integrated OD to TDD converter/receiver and at least one data port.

In one embodiment, the integrated converter/receiver in-wall mounted data access station is positioned in a wall cavity such that the integrated OD to TDD converter/receiver of the integrated converter/receiver in-wall mounted data access station is positioned within the wall cavity and the at least one TDD data port faces outward from the wall cavity and wall.

In one embodiment, the integrated converter/receiver in-wall mounted data access station is dimensioned such that the at least one of the at least two integrated converter/receiver in-wall mounted data access stations fits within a standard USA single gang electrical box.

In one embodiment, the integrated converter/receiver in-wall mounted data access station has a height dimension of approximately 70 mm, a width dimension of approximately 52 mm, and a depth dimension of approximately 60 mm.

In one embodiment, the at least one data port of the at least one data port of the integrated converter/receiver in-wall mounted data access station is a standard RJ-45 data port.

The present invention has been described in particular detail with respect to specific possible embodiments. Those of skill in the art will appreciate that the invention may be practiced in other embodiments. For example, the nomenclature used for components, capitalization of component designations and terms, the attributes, or structural aspect is not significant, mandatory, or limiting, and the mechanisms that implement the invention or its features can have various different names, formats, or protocols. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

In addition, the operations and structures shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for providing a data network comprising;
providing Traditional Digital Data (TDD) to a multi-port Ethernet fiber switch, the multi-port Ethernet fiber switch having two or more multi-port Ethernet fiber switch ports;
converting the TDD to Optical Data (OD) using the multi-port Ethernet fiber switch;
providing the OD to at least two of the multi-port Ethernet fiber switch ports;
coupling at least two optical lines to the at least two of the multi-port Ethernet fiber switch ports that are provided the OD, wherein at least one of the at least two optical lines is a single-mode optical fiber line;
coupling the at least two optical lines to at least two integrated converter/receiver in-wall mounted data access stations, each of the at least two integrated converter/receiver in-wall mounted data access stations including:
an integrated converter/receiver in-wall mounted data access station substrate;
an integrated converter/receiver in-wall mounted data access station heat sink mounted on the integrated converter/receiver in-wall mounted data access station substrate;
integrated converter/receiver in-wall mounted data access station circuitry, the integrated converter/receiver in-wall mounted data access station circuitry mounted on the integrated converter/receiver in-wall mounted data access station substrate;
an integrated converter/receiver in-wall mounted data access station power connector mounted on the integrated converter/receiver in-wall mounted data access station substrate for connecting a dedicated power line, the dedicated power line providing power to the integrated converter/receiver in-wall mounted data access station from a power distribution network that is external to the integrated converter/receiver in-wall mounted data access station;
an integrated OD to TDD converter/receiver, the integrated OD to TDD converter/receiver being at least partially mounted on the integrated converter/receiver in-wall mounted data access station substrate, the integrated OD to TDD converter/receiver for converting OD to TDD, the integrated OD to TDD converter/receiver being operatively coupled to the integrated converter/receiver in-wall mounted data access station circuitry for providing the TDD to the integrated converter/receiver in-wall mounted data access station circuitry, an OD input connector that extends substantially parallel to a wall outer surface when the integrated converter/receiver in-wall mounted data access station is positioned entirely within a wall cavity formed in a wall, the OD input connector for directly coupling an optical data line to the integrated OD to TDD converter/receiver, the optical data line being a line separate and distinct from the dedicated power line for providing power to the power connector of the integrated converter/receiver in-wall mounted data access station;
at least one TDD data port, the at least one TDD data port for receiving the TDD from the integrated OD to TDD converter/receiver and providing the TDD to at least one device external to the integrated converter/receiver in-wall mounted data access station; and
an integrated converter/receiver in-wall mounted data access station housing, the integrated converter/receiver in-wall mounted data access station housing enclosing:
the integrated converter/receiver in-wall mounted data access station substrate;
the integrated converter/receiver in-wall mounted data access station heat sink;
the integrated converter/receiver in-wall mounted data access station circuitry;
the integrated converter/receiver in-wall mounted data access station power connector;
the integrated OD to TDD converter/receiver; and
at least part of the at least one data TDD port,
wherein the integrated converter/receiver in-wall mounted data access station has a height dimension of approximately 70 mm, a width dimension of approximately 52 mm, and a depth dimension of approximately 60 mm;
further wherein the integrated converter/receiver in-wall mounted data access station includes one or more mounting portions which allow the integrated converter/receiver in-wall mounted data access station to be mounted in standard in-wall electrical outlet sized wall mounting ring;
positioning each of the integrated converter/receiver in-wall mounted data access stations entirely within a wall cavity formed in a wall such that the integrated converter/receiver in-wall mounted data access station, including the integrated converter/receiver in-wall mounted data access station substrate, the integrated converter/receiver in-wall mounted data access station heat sink, the integrated converter/receiver in-wall mounted data access station circuitry, the integrated converter/receiver in-wall mounted data access station power connector, the integrated OD to TDD converter/receiver, and the least one TDD data port, is positioned entirely within the wall cavity and entirely within an industry standard single gang wall mounting system such that the at least one data port faces outward from an outer surface of the wall and the OD input connector extends substantially parallel to the outer surface of the wall inside the wall cavity;
transmitting the OD to the at least two integrated converter/receiver in-wall mounted data access stations using the at least two optical lines connected to the at least two multi-port Ethernet fiber switch ports;
at each of the at least two integrated converter/receiver in-wall mounted data access stations converting the OD to TDD using the integrated OD to TDD converter/receiver; and
at each of the at least two integrated converter/receiver in-wall mounted data access stations providing the TDD to each of the at least one TDD data port.

2. The method for providing a data network of claim 1 wherein at least one of the two optical lines is a multi-mode optical fiber line.

3. The method for providing a data network of claim 1 wherein at least one TDD data port of at least one of the at least two integrated converter/receiver in-wall mounted data access stations is a standard RJ-45 data port.

4. The method for providing a data network of claim 1 wherein at least one of the at least two integrated converter/receiver in-wall mounted data access stations has a removable faceplate.

5. A system for providing a data network comprising:
Traditional Digital Data (TDD);
a multi-port Ethernet fiber switch, the multi-port Ethernet fiber switch receiving the TDD, the multi-port Ethernet fiber switch having a TDD to OD converter/transmitter for converting TDD to OD, the multi-port Ethernet fiber switch having two or more multi-port Ethernet fiber switch ports, wherein the multi-port Ethernet fiber switch converts the TDD to OD and provides the converted OD at each of the two or more multi-port Ethernet fiber switch ports;
at least one wall, the wall having a wall inner surface and a wall outer surface;
a wall cavity formed in the at least one wall;
at least one industry standard single gang wall mounting system;

at least two integrated converter/receiver in-wall mounted data access stations, each integrated converter/receiver in-wall mounted data access station including:

an integrated converter/receiver in-wall mounted data access station substrate;

an integrated converter/receiver in-wall mounted data access station heat sink mounted on the integrated converter/receiver in-wall mounted data access station substrate;

integrated converter/receiver in-wall mounted data access station circuitry, the integrated converter/receiver in-wall mounted data access station circuitry mounted on the integrated converter/receiver in-wall mounted data access station substrate;

an integrated converter/receiver in-wall mounted data access station power connector mounted on the integrated converter/receiver in-wall mounted data access station substrate for connecting a dedicated power line, the dedicated power line providing power to the integrated converter/receiver in-wall mounted data access station from a power distribution network that is external to the integrated converter/receiver in-wall mounted data access station;

an integrated OD to TDD converter/receiver, the integrated OD to TDD converter/receiver being at least partially mounted on the integrated converter/receiver in-wall mounted data access station substrate, the integrated OD to TDD converter/receiver for converting OD to TDD, the integrated OD to TDD converter/receiver being operatively coupled to the integrated converter/receiver in-wall mounted data access station circuitry for providing the TDD to the integrated converter/receiver in-wall mounted data access station circuitry, an OD input connector that extends substantially parallel to the wall outer surface when the integrated converter/receiver in-wall mounted data access station is positioned entirely within the wall cavity formed in the wall, the OD input connector for directly coupling an optical data line to the integrated OD to TDD converter/receiver, the optical data line being a line separate and distinct from the dedicated power line for providing power to the power connector of the integrated converter/receiver in-wall mounted data access station;

at least one TDD data port, the at least one TDD data port for receiving the TDD from the integrated OD to TDD converter/receiver and providing the TDD to at least one device external to the integrated converter/receiver in-wall mounted data access station; and an integrated converter/receiver in-wall mounted data access station housing, the integrated converter/receiver in-wall mounted data access station housing enclosing the integrated converter/receiver in-wall mounted data access station substrate, the integrated converter/receiver in-wall mounted data access station heat sink, the integrated converter/receiver in-wall mounted data access station circuitry, the integrated converter/receiver in-wall mounted data access station power connector, the integrated OD to TDD converter/receiver, and at least part of the at least one data TDD port, wherein the integrated converter/receiver in-wall mounted data access station housing has a height dimension of approximately 70 mm, a width dimension of approximately 52 mm, and a depth dimension of approximately 60 mm, further wherein the integrated converter/receiver in-wall mounted data access station includes one or more mounting portions which allow the integrated converter/receiver in-wall mounted data access station to be mounted in standard in-wall electrical outlet sized wall mounting ring;

further wherein at least one of the integrated converter/receiver in-wall mounted data access stations is positioned entirely within the wall cavity formed in the at least one wall such that the integrated converter/receiver in-wall mounted data access station, including the integrated converter/receiver in-wall mounted data access station substrate, the integrated converter/receiver in-wall mounted data access station heat sink, the integrated converter/receiver in-wall mounted data access station circuitry, the integrated converter/receiver in-wall mounted data access station power connector, the integrated OD to TDD converter/receiver, and the least one TDD data port, are positioned entirely within the wall cavity and entirely within the industry standard single gang wall mounting system such that the at least one TDD data port faces outward from the wall outer surface and the OD input connector extends substantially parallel to the wall outer surface inside the wall cavity;

at least two optical lines coupled to at least two of the multi-port Ethernet fiber switch ports, wherein at least one of the at least two optical lines is a single-mode optical fiber line;

further wherein the at least two optical lines provide the OD from the multi-port Ethernet fiber switch to the integrated OD to TDD converter/receivers of the at least two integrated converter/receiver in-wall mounted data access stations, further wherein the OD provided at the OD to TDD converter/receivers of the at least two integrated converter/receiver in-wall mounted data access stations is converted back to TDD by the OD to TDD converter/receivers of the at least two integrated converter/receiver in-wall mounted data access stations, further wherein at each of the at least two integrated converter/receiver in-wall mounted data access stations the TDD converted by the OD to TDD converter/receivers of the at least two integrated converter/receiver in-wall mounted data access stations is provided to each of the at least one TDD data ports of the at least two integrated converter/receiver in-wall mounted data access stations.

6. The system for providing a data network of claim 5 wherein at least one of the two optical lines is a multi-mode optical fiber line.

7. The system for providing a data network of claim 5 wherein at least one TDD data port of at least one of the at least two integrated converter/receiver in-wall mounted data access stations is a standard RJ-45 data port.

8. The system for providing a data network of claim 5 wherein at least one of the at least two integrated converter/receiver in-wall mounted data access stations has a removable faceplate.

9. An integrated converter/receiver in-wall mounted data access station comprising:

an integrated converter/receiver in-wall mounted data access station substrate;

an integrated converter/receiver in-wall mounted data access station heat sink mounted on the integrated converter/receiver in-wall mounted data access station substrate;

integrated converter/receiver in-wall mounted data access station circuitry, the integrated converter/receiver in-wall mounted data access station circuitry mounted on the integrated converter/receiver in-wall mounted data access station substrate;

an integrated converter/receiver in-wall mounted data access station power connector mounted on the integrated converter/receiver in-wall mounted data access station substrate for connecting a dedicated power line, the dedicated power line providing power to the integrated converter/receiver in-wall mounted data access station from a power distribution network that is external to the integrated converter/receiver in-wall mounted data access station;

an integrated OD to TDD converter/receiver, the integrated OD to TDD converter/receiver being at least partially mounted on the integrated converter/receiver in-wall mounted data access station substrate, the integrated OD to TDD converter/receiver for converting OD to TDD, the integrated OD to TDD converter/receiver being operatively coupled to the integrated converter/receiver in-wall mounted data access station circuitry for providing the TDD to the integrated converter/receiver in-wall mounted data access station circuitry, an OD input connector that extends substantially parallel to a wall outer surface when the integrated converter/receiver in-wall mounted data access station is positioned entirely within a wall cavity formed in a wall, the OD input connector for directly coupling an optical data line to the integrated OD to TDD converter/receiver, the optical data line being a line separate and distinct from the dedicated power line for providing power to the power connector of integrated converter/receiver in-wall mounted data access station;

at least one TDD data port, the at least one TDD data port for receiving the TDD from the integrated OD to TDD converter/receiver and providing the TDD to at least one device external to the integrated converter/receiver in-wall mounted data access station; and an integrated converter/receiver in-wall mounted data access station housing, the integrated converter/receiver in-wall mounted data access station housing enclosing:
 the integrated converter/receiver in-wall mounted data access station substrate;
 the integrated converter/receiver in-wall mounted data access station heat sink;
 the integrated converter/receiver in-wall mounted data access station circuitry;
 the integrated converter/receiver in-wall mounted data access station power connector;
 the integrated OD to TDD converter/receiver; and
 at least part of the at least one data TDD port, wherein the integrated converter/receiver in-wall mounted data access station housing has a height dimension of approximately 70 mm, a width dimension of approximately 52 mm, and a depth dimension of approximately 60 mm, further wherein the integrated converter/receiver in-wall mounted data access station includes one or more mounting portions which allow the integrated converter/receiver in-wall mounted data access station to be mounted in standard in-wall electrical outlet sized wall mounting ring;

further wherein when the integrated converter/receiver in-wall mounted data access station is positioned entirely within a wall cavity formed in a wall the integrated converter/receiver in-wall mounted data access station, including the integrated converter/receiver in-wall mounted data access station substrate, the integrated converter/receiver in-wall mounted data access station heat sink, the integrated converter/receiver in-wall mounted data access station circuitry, the integrated converter/receiver in-wall mounted data access station power connector, the integrated OD to TDD converter/receiver, and the least one data port, is positioned entirely within the wall cavity and entirely within an industry standard single gang wall mounting system such that the at least one data port faces outward from the wall surface and the OD input connector extends substantially parallel to the wall outer surface inside the cavity wall.

10. The integrated converter/receiver in-wall mounted data access station of claim 9 wherein at least one data port of the at least one data port of the integrated converter/receiver in-wall mounted data access station is a standard RJ-45 data port.

11. The integrated converter/receiver in-wall mounted data access station of claim 9 wherein the optical data line is a single-mode optical fiber line.

12. The integrated converter/receiver in-wall mounted data access station of claim 9 further comprising one or more LED status lights.

13. An integrated converter/receiver in-wall mounted data access station comprising:
 a wall, the wall having a wall inner surface and a wall outer surface;
 a wall cavity formed in the wall;
 an integrated converter/receiver in-wall mounted data access station, the integrated converter/receiver in-wall mounted data access station including:
  an integrated converter/receiver in-wall mounted data access station substrate;
  an integrated converter/receiver in-wall mounted data access station heat sink mounted on the integrated converter/receiver in-wall mounted data access station substrate;
  integrated converter/receiver in-wall mounted data access station circuitry, the integrated converter/receiver in-wall mounted data access station circuitry mounted on the integrated converter/receiver in-wall mounted data access station substrate;
  an integrated converter/receiver in-wall mounted data access station power connector mounted on the integrated converter/receiver in-wall mounted data access station substrate for connecting a dedicated power line, the dedicated power line providing power to the integrated converter/receiver in-wall mounted data access station from a power distribution network that is external to the integrated converter/receiver in-wall mounted data access station;
  an integrated OD to TDD converter/receiver; the integrated OD to TDD converter/receiver being at least partially mounted on the integrated converter/receiver in-wall mounted data access station substrate, the integrated OD to TDD converter/receiver for converting OD to TDD, the integrated OD to TDD converter/receiver being operatively coupled to the integrated converter/receiver in-wall mounted data access station circuitry for providing the TDD to the integrated converter/receiver in-wall mounted data access station circuitry, the integrated OD to TDD converter/receiver including an OD input connector that is substantially parallel to the wall outer surface when the integrated converter/receiver in-wall mounted data access station is positioned entirely within the wall cavity formed in the wall, the OD input connector for directly coupling an optical data line to the integrated OD to TDD converter/receiver, the optical data line being a line separate and distinct from the dedicated power line for providing power to the power connector of integrated converter/receiver in-wall mounted data access station;

at least one TDD data port, the at least one TDD data port for receiving the TDD from the integrated OD to TDD converter/receiver and providing the TDD to at least one device external to the integrated converter/receiver in-wall mounted data access station; and an integrated converter/receiver in-wall mounted data access station housing, the integrated converter/receiver in-wall mounted data access station housing enclosing:

the integrated converter/receiver in-wall mounted data access station substrate;

the integrated converter/receiver in-wall mounted data access station heat sink;

the integrated converter/receiver in-wall mounted data access station circuitry;

the integrated converter/receiver in-wall mounted data access station power connector;

at least part of the integrated OD to TDD converter/receiver; and at least part of the at least one data TDD port, wherein the integrated converter/receiver in-wall mounted data access station housing has a height dimension of approximately 70 mm, a width dimension of approximately 52 mm, and a depth dimension of approximately 60 mm, further wherein the integrated converter/receiver in-wall mounted data access station includes one or more mounting portions which allow the integrated converter/receiver in-wall mounted data access station to be mounted in standard in-wall electrical outlet sized wall mounting ring;

the integrated converter/receiver in-wall mounted data access station being positioned entirely within the wall cavity formed in the wall such that the integrated converter/receiver in-wall mounted data access station, including the integrated converter/receiver in-wall mounted data access station substrate, the integrated converter/receiver in-wall mounted data access station heat sink, the integrated converter/receiver in-wall mounted data access station circuitry, the integrated converter/receiver in-wall mounted data access station power connector, the integrated OD to TDD converter/receiver, and the least one data port, is positioned entirely within the wall cavity and entirely within an industry standard single gang wall mounting system such that the at least one data port faces outward from the wall outer surface and the OD input connector is substantially parallel to the wall outer surface inside the wall cavity.

14. The integrated converter/receiver in-wall mounted data access station of claim 13 wherein the optical data line is a single-mode optical fiber line.

15. The integrated converter/receiver in-wall mounted data access station of claim 13 wherein at least one data port of the integrated converter/receiver in-wall mounted data access station is a standard RJ-45 data port.

16. The integrated converter/receiver in-wall mounted data access station of claim 13 further comprising one or more LED status lights.

* * * * *